United States Patent
Arai et al.

(10) Patent No.: US 9,998,654 B2
(45) Date of Patent: Jun. 12, 2018

(54) INFORMATION PROCESSING DEVICE AND METHOD FOR CONTROLLING INFORMATION PROCESSING DEVICE

(71) Applicant: Panasonic Intellectual Property Corporation of America, Torrance, CA (US)

(72) Inventors: Toshiya Arai, Osaka (JP); Shinji Uchida, Osaka (JP); Masako Ikeda, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 154 days.

(21) Appl. No.: 14/906,437

(22) PCT Filed: Jul. 16, 2014

(86) PCT No.: PCT/JP2014/003772
§ 371 (c)(1),
(2) Date: Jan. 20, 2016

(87) PCT Pub. No.: WO2015/011898
PCT Pub. Date: Jan. 29, 2015

(65) Prior Publication Data
US 2016/0156840 A1     Jun. 2, 2016

(30) Foreign Application Priority Data

Jul. 22, 2013   (JP) ................................. 2013-151759

(51) Int. Cl.
*H04N 5/00* (2011.01)
*H04N 5/232* (2006.01)
*H04N 5/225* (2006.01)

(52) U.S. Cl.
CPC ....... *H04N 5/23219* (2013.01); *H04N 5/2256* (2013.01); *H04N 5/23222* (2013.01); *H04N 5/23293* (2013.01)

(58) Field of Classification Search
CPC ....... A61B 5/00; A61B 5/0059; A61B 5/0064; A61B 5/1176; A61B 5/411; A61B 5/442;
(Continued)

(56) References Cited

U.S. PATENT DOCUMENTS 6,679,830 B2 * 1/2004 Kolarovic ............. A61G 11/00
                                                            600/22
7,872,670 B2 * 1/2011 Kikuchi ............. H04N 5/23212
                                                            348/157
(Continued)

FOREIGN PATENT DOCUMENTS

JP    2005-005791 A    1/2005
JP    2005-167789 A    6/2005
(Continued)

OTHER PUBLICATIONS

International Search Report for corresponding International Application No. PCT/JP2014/003772 dated Oct. 21, 2014.
(Continued)

*Primary Examiner* — Frank Huang
(74) *Attorney, Agent, or Firm* — Renner, Otto, Boisselle & Sklar, LLP

(57) ABSTRACT

A control method for controlling an information processing device 101 including a camera 10 for receiving an image and a display 14 having a display surface on the same side as an image-receiving side of the camera 10 according to an embodiment causes a computer 18A of the information processing device 101 for receiving an image of a face 21 of a subject from the camera 10, horizontally inverting the received image, and displaying the horizontally-inverted
(Continued)

image on the display 14, to execute: detecting a distance between the information processing device 101 and a reference portion included in the face 21 of the subject; determining a scaling factor based on a ratio between a reference distance used for evaluating the image of the face 21 of the subject and the detected distance; and displaying, on the display 14, as a guide image 35 for guiding the subject in such a direction as to change a distance between the information processing device and the subject, an image corresponding to at least one part included in an image obtained by enlarging or shrinking the horizontally-inverted image of the face based on the determined scaling factor.

17 Claims, 21 Drawing Sheets

(58) Field of Classification Search
CPC ....... A61B 5/444; A61B 5/445; A61B 5/0088; A61B 5/1078; A61B 5/4547
See application file for complete search history.

(56) References Cited

U.S. PATENT DOCUMENTS

| | | | | |
|---|---|---|---|---|
| 9,716,842 | B1* | 7/2017 | Worley | H04N 5/2621 |
| 2003/0044047 | A1* | 3/2003 | Kelly | B66F 9/0755 |
| | | | | 382/104 |
| 2004/0218810 | A1 | 11/2004 | Momma | |
| 2004/0249290 | A1* | 12/2004 | Shani | A61B 5/0059 |
| | | | | 600/476 |
| 2005/0027336 | A1* | 2/2005 | Nemenov | A61B 5/0059 |
| | | | | 607/98 |
| 2005/0212950 | A1* | 9/2005 | Kanai | H04N 5/23212 |
| | | | | 348/345 |
| 2006/0139707 | A1* | 6/2006 | Kimura | H04N 1/62 |
| | | | | 358/518 |
| 2007/0113099 | A1 | 5/2007 | Takikawa et al. | |
| 2007/0217199 | A1* | 9/2007 | Adam | A61N 5/0616 |
| | | | | 362/276 |
| 2008/0120577 | A1* | 5/2008 | Ma | G06F 3/017 |
| | | | | 715/863 |
| 2008/0136958 | A1* | 6/2008 | Nakahara | G06K 9/00255 |
| | | | | 348/345 |
| 2008/0294012 | A1* | 11/2008 | Kurtz | A61B 5/0059 |
| | | | | 600/300 |
| 2010/0322300 | A1* | 12/2010 | Li | G06K 9/00234 |
| | | | | 375/240.01 |
| 2013/0171601 | A1* | 7/2013 | Yuasa | A61B 5/1114 |
| | | | | 434/258 |
| 2015/0230863 | A1* | 8/2015 | Youngquist | A61B 18/203 |
| | | | | 606/9 |

FOREIGN PATENT DOCUMENTS

| | | |
|---|---|---|
| JP | 2005-284225 A | 10/2005 |
| JP | 2007-157115 A | 6/2007 |
| JP | 4485837 B2 | 4/2010 |
| JP | 5206516 B2 | 3/2013 |
| KR | 20120035964 A | 4/2012 |

OTHER PUBLICATIONS

Extended European for corresponding European Application No. 14829757.5 dated Jun. 3, 2016.

* cited by examiner

FIG.1
(a) 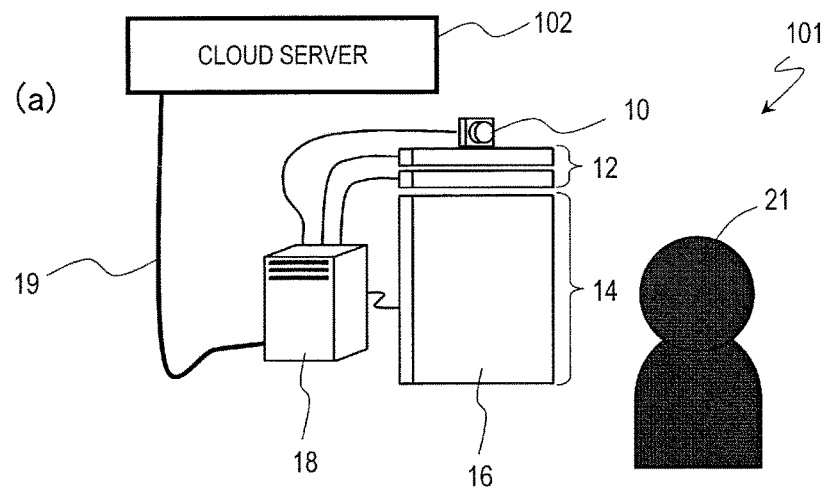
(b) 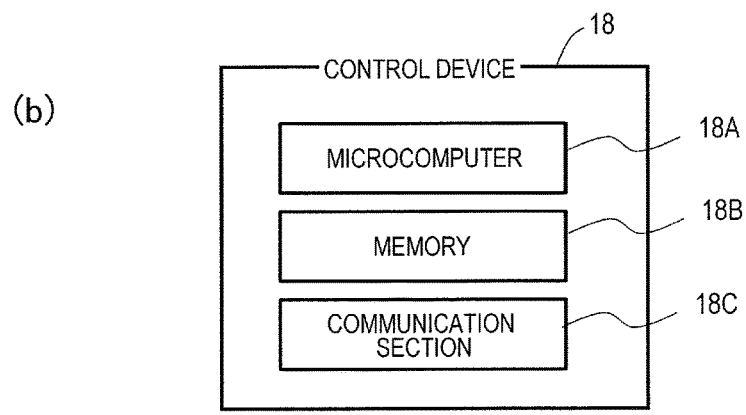
(c) 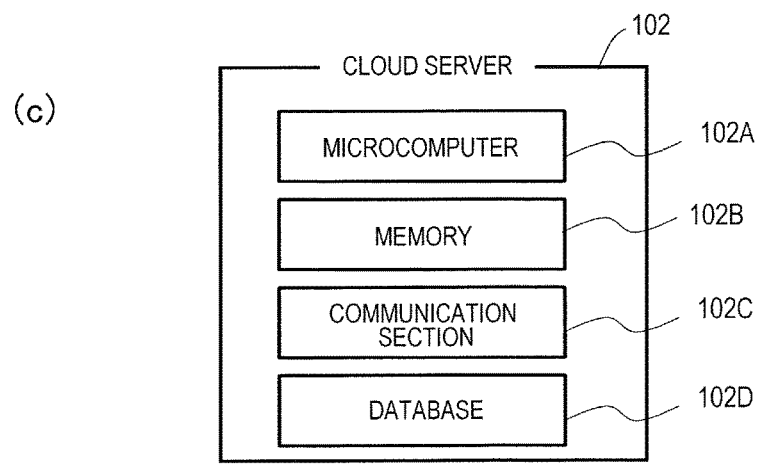

FIG.4
(a) 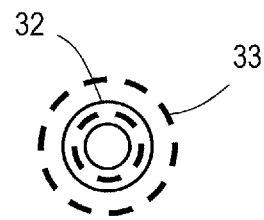
(b) 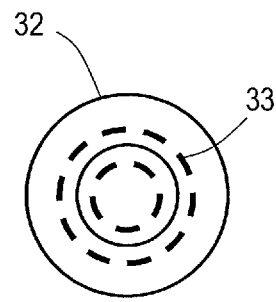
(c) 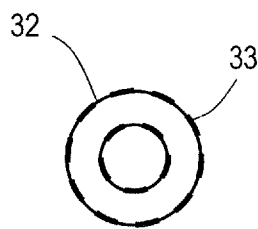

INFORMATION PROCESSING DEVICE AND METHOD FOR CONTROLLING INFORMATION PROCESSING DEVICE

TECHNICAL FIELD

The present disclosure relates to an information processing device capable of capturing an image of the face of a user, and a method for controlling the same.

BACKGROUND ART

There have been studies on information processing devices for capturing an image of the skin of the face of a human by means of a camera to evaluate the condition of the skin based on the captured image, and methods for controlling such information processing devices.

CITATION LIST

Patent Literature

[Patent Document No. 1] Japanese Patent No. 4485837
[Patent Document No. 2] Japanese Patent No. 5206516

SUMMARY OF INVENTION

Technical Problem

However, the information processing devices and the methods for controlling such information processing devices need further improvements.

Solution to Problem

A control method according to one embodiment of the present disclosure is a control method for controlling an information processing device including a camera for receiving an image and a display having a display surface on the same side as an image-receiving side of the camera, wherein: the control method causes a computer of the information processing device for receiving an image of a face of a subject from the camera, horizontally inverting the received image, and displaying the horizontally-inverted image on the display, to execute: detecting a distance between the information processing device and a reference portion included in the face of the subject; determining a scaling factor based on a ratio between a reference distance used for evaluating the image of the face of the subject and the detected distance; and displaying, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

Advantageous Effects of Invention

The embodiment above realized further improvements.

BRIEF DESCRIPTION OF DRAWINGS

FIG. 1 (a) is a diagram showing an information processing device according to an embodiment, (b) is a diagram showing a configuration of a control device according to an embodiment, and (c) is a diagram showing a configuration of a cloud server according to an embodiment.

FIG. 4 (a) to (c) are diagram each showing a positional relationship between a marker image and a guide image according to an embodiment.

Figure 2:
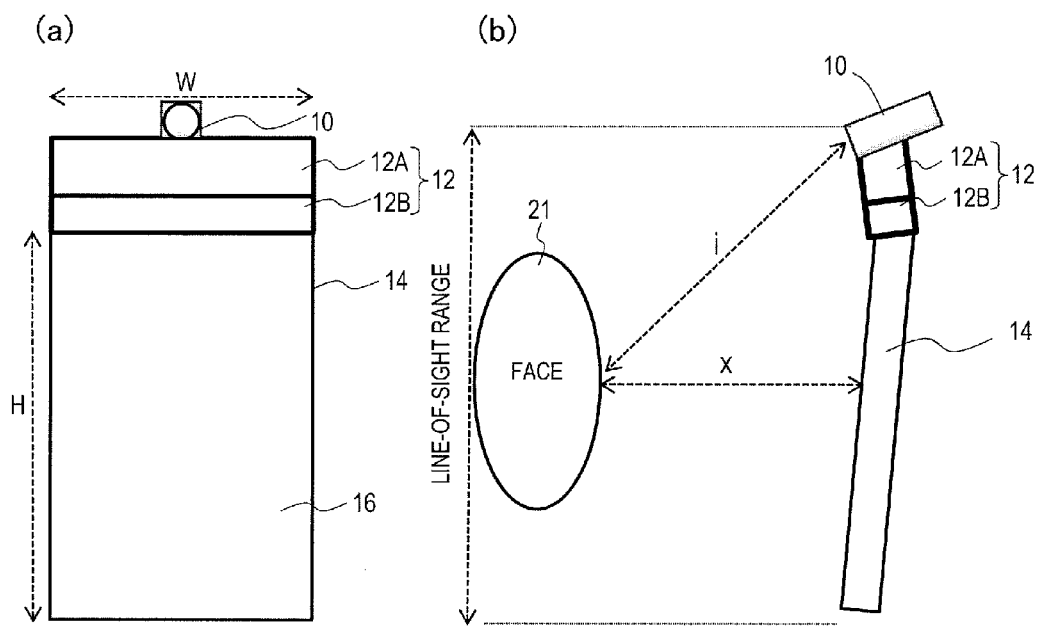
FIGS. 2 (a) and (b) are diagrams showing an example arrangement of components of an information processing device according to an embodiment.

DESCRIPTION OF EMBODIMENTS (Findings Forming Basis of the Present Invention)

There are devices for capturing an image of the skin of the face of a human by means of a camera to evaluate the condition of the skin based on the captured skin image. For example, Patent Document No. 1 discloses a skin image processing device for evaluating the condition of the skin based on a skin image captured by means of a camera installed at a position away from the skin surface. With the skin image processing device of Patent Document No. 1, the user's head is fixed by placing the chin on a base and pressing the forehead against a holder so that an image is captured while there is a suitable distance between the camera and the skin surface. With the face of the user fixed, an image of the skin surface of the face is captured by moving the camera while keeping a constant distance between the camera and the face, and skin conditions, such as pigmentation, pores and wrinkles, are evaluated based on the obtained skin image.

Being different from the technical field of evaluating skin conditions, Patent Document No. 2 discloses an image-capturing assisting device for notifying the driver of a car of an image-capturing position that is suitable for capturing an image of the face in order to recognize the facial expression of the driver.

It is believed that when capturing an image of the face of a user, it is possible to obtain an image suitable for evaluating the skin surface by capturing an image while keeping a constant distance between the face of the user and the camera. Specifically, as the distance does not change every time an image is captured, it is possible to capture images of the face of a user under the same condition, which makes it easier to compare between the current and past skin conditions.

However, with the skin image processing device of Patent Document No. 1, an image is captured while the chin and the forehead of a user are fixed using equipments. With such a method in which the chin and the forehead of a user are fixed using equipments, the device will be large and it is not possible to capture an image under natural circumstances. Also, fixing the chin and the forehead using equipments is troublesome for the user, and makes it impossible to capture an image of skin areas that are in contact with the retainers.

With the image-capturing assisting device of Patent Document No. 2, a reference point is displayed on a display device, together with the captured face image of the driver, and the position of the eyes or the nose of the face image of the driver is guided to the position of the reference point, thus prompting to move the face of the driver to a position that is suitable for the image-capturing operation. Accordingly, the movement of the face of the user can be prompted only for the up-down and left-right directions on the display screen, and it is not possible to allow the user to recognize a suitable position (a suitable distance between the user and the camera) in the axial direction (the front-back direction of the face of the user) extending between the user and the camera, or to prompt to move in the axial direction extending between the user and the camera.

In order to solve these problems set forth above, the following solutions have been considered.

One embodiment of a control method for controlling an information processing device is a control method for controlling an information processing device including a camera for receiving an image and a display having a display surface on the same side as an image-receiving side of the camera, wherein: the control method causes a computer of the information processing device for receiving an image of a face of a subject from the camera, horizontally inverting the received image, and displaying the horizontally-inverted image on the display, to execute: detecting a distance between the information processing device and a reference portion included in the face of the subject; determining a scaling factor based on a ratio between a reference distance used for evaluating the image of the face of the subject and the detected distance; and displaying, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

According to the embodiment above, the control method includes: detecting a distance between the information processing device and a reference portion included in the face of the subject; determining a scaling factor based on a ratio between a reference distance used for evaluating the image of the face of the subject and the detected distance; and displaying, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

Thus, where the user captures an image of the face by means of the information processing device, for example, control displays, on the display, a guide image for guiding the face of the user so as to change the distance from the information processing device based on the ratio between the distance between the detected information processing device and the reference portion included in the face of the user (subject) and the reference distance used for evaluating the image of the face; and the user changes distance from the information processing device by moving the position of the face of the user himself/herself, referring to the guide image, for example.

Therefore, it is possible to capture an image of the face while keeping a constant distance between the information processing device and the face of the user. Here, no parts of the face need to be fixed using equipments, or the like, in order to capture an image of the face while keeping the distance constant, and it is therefore possible to simplify the device and to capture an image of the face under natural circumstances, while causing no trouble for the user of fixing his/her face to the device.

Moreover, for example, where an image-capturing operation is done every day, the image-capturing operation can be performed under the same condition, making it easier to compare between past and current skin conditions.

For example, where the skin condition is evaluated based on a captured image of the face, for example, the size of an area that is determined to be a spot or a wrinkle on the skin surface based on the captured image of the face can be measured by counting the number of pixels on the captured image.

In the embodiment above, for example, when it is determined that a difference between the reference distance and the detected distance is within a predetermined range, the camera may be activated to capture an image of the subject.

According to the embodiment above, when it is determined that the difference between the reference distance and the detected distance is within a predetermined range, the camera is activated to capture an image of the subject.

Thus, an image of the face is captured while the distance between the information processing device and the face of the user (subject) is constant. Therefore, it is possible to avoid capturing an image at a different distance each time an image of the subject is captured, and to obtain captured images under the same condition.

In the embodiment above, for example, the information processing device may include a lighting device having a light-outputting port on the same side as the image-receiving side of the camera; and when capturing an image of the subject, the lighting device may be activated to irradiate the subject with light.

According to the embodiment above, when capturing an image of the subject, the lighting device is activated to irradiate the subject with light.

Thus, the subject in the captured image is irradiated with light in a constant manner. This not only makes constant the distance between the information processing device and the reference portion of the face of the user (subject), but it also makes constant how the face of the subject is irradiated with light, thus allowing for captured images to be obtained under the same condition.

In the embodiment above for example, the captured image may be an image to be used for evaluating the face of the subject.

According to the embodiment above, the captured image of the subject is used for evaluating the face of the user.

Thus, the captured image is used for the evaluation of the face of the user under the same condition, i.e., the distance between the information processing device and the face of the user of the subject is constant.

Therefore, where images of the face of the user which have been captured at different times or on different days are compared with each other, for example, there is no longer a need for a preliminary process of matching the scale or the order of the images, thus making it easier to compare between images.

In the embodiment above, the reference distance may be the focal length of the camera, for example.

According to the embodiment above, the focal length of the camera is fixed, and an image of the subject is captured at an optimal distance for the focal length of the camera. Thus, the image of the subject is a clear image taken at the focal length, thereby improving the accuracy of analysis of the face of the subject.

In the embodiment above, for example, the distance with which the results are closest to the results of sensory evaluations by specialists may be empirically obtained in advance for each index for which the face of the subject is evaluated, and the determination may be made based on the evaluation index for each index for which the face of the subject is evaluated.

According to the embodiment above, an image-capturing operation is performed by changing the reference distance for each index for which evaluation is performed. Thus, the evaluation of the face of the subject is close to sensory evaluations by specialists, thus improving the evaluation accuracy.

In the embodiment above the guide image may be displayed on the display while being superimposed over the image of the face of the subject, for example.

According to the embodiment above, the guide image is displayed on the display while being superimposed over the image of the face of the subject.

Thus, the user moves the position of the face of the user himself/herself, referring to the guide image, while checking the face of the user himself/herself displayed on the display.

Therefore, it is possible to keep a constant distance between the information processing device and the face of the user, referring to the guide, in order to obtain captured images under the same condition, while the user checks the condition of the face by himself/herself.

In the embodiment above, for example, an image of the same part as the image corresponding to the at least one part included in the horizontally-inverted image of the face may be displayed on the display as a basic face guide image for presenting the current distance between the information processing device and the subject.

According to the embodiment above, the basic face guide image is displayed on the display while being superimposed over the image of the face of the subject. Thus, the user moves the position of the face of the user himself/herself, referring to the guide image, while checking the basic face guide image displayed on the display. Therefore, it is easy for the user to visually perceive how the user should move the face, referring to the guide image.

In the embodiment above, for example, the image corresponding to the at least one part may have a shape corresponding to an outline of the at least one part.

In the embodiment above, for example, the basic face guide image may have a shape corresponding to the outline of the at least one part.

According to the embodiment above, the image corresponding to the at least one part and the basic face guide image each have a shape corresponding to the outline of the at least one part.

Therefore, the user can keep a constant distance between the information processing device and the face of the user (subject) only by moving the position of the face so that the outline of a part of the face of the user himself/herself or the basic face guide image coincides with the guide image displayed on the display. It is easy for the user to visually perceive how the user should move the face in order to capture an image with the constant distance.

In the embodiment above, for example, the shape corresponding to the outline of the at least one part may include a shape corresponding to at least one of the eyes, the nose and the mouth.

According to the embodiment above, the shape corresponding to the outline of the at least one part includes a shape corresponding to at least one of the eyes, the nose, the mouth.

Therefore, the user can keep a constant distance between the information processing device and the face of the user only by moving the position of the face so that at least one of the eyes, the nose, the mouth of the user himself/herself coincides with the guide image displayed on the display. It is easy for the user to visually perceive how the user should move the face in order to capture an image with the constant distance.

In the embodiment above, for example, the image corresponding to the at least one part may have a shape corresponding to an outline of the face of the subject or an outline of the eyes, the nose or the mouth included in the face of the subject.

In the embodiment above, for example, the basic face guide image may have a shape corresponding to an outline of the face of the subject or an outline of the eyes, the nose or the mouth included in the face of the subject.

According to the embodiment above, the image corresponding to the at least one part and the basic face guide image each have a shape corresponding to the outline of the face of the subject or the outline of the eyes, the nose or the mouth included in the face of the subject.

Therefore, the user can keep a constant distance between the information processing device and the face of the user only by moving the position of the face so that the outline of the face of the user himself/herself or the outline of the eyes, the nose or the mouth or the basic face guide image coincides with the guide image displayed on the display. It is easy for the user to visually perceive how the user should move the face in order to capture an image with the constant distance.

In the embodiment above, for example, the reference portion may be a plurality of portions included in the face of the subject; and the distance may be an average distance among distances between the information processing device and a plurality of reference portions included in the face of the subject.

According to the embodiment above, the reference portion is a plurality of portions included in the face of the subject; and the distance is an average distance among distances between the information processing device and a plurality of reference portions included in the face of the subject.

Thus, it is possible to reduce the influence of undulations of the face of the user on the detection of the distance between the information processing device and the face of the user (subject). For example, where the projection of the nose, the hollow about the eyes, and the like, are used as reference portions, it is possible to avoid detecting values that deviate from the distance from the information processing device to the forehead and the cheeks, which account for the majority of the skin of the face.

This makes it possible to display, on the display, such a guide image as to bring the distance between the information processing device and the face of the user (subject) closer to the reference distance with a high accuracy, and it is possible to improve the accuracy of skin analysis based on captured images.

In the embodiment above, for example, the plurality of portions may include the same number of portions selected from each of a left half and a right half of the face of the subject.

In the embodiment above, for example, the plurality of portions may include the same number of portions selected from each of an upper half and a lower half of the face of the subject with respect to a predetermined reference point.

In the embodiment above, for example, an image corresponding to at least one part included in the enlarged image may be a guide image for guiding the subject toward a direction of moving the face closer to the information processing device; and an image corresponding to at least one part included in the shrunk image may be a guide image for guiding the subject toward a direction of moving the face of the subject away from the information processing device.

In the embodiment above, for example, the guide image may be an image for guiding the subject so as to bring the detected distance closer to the reference distance.

According to the embodiment above, the guide image is an image for guiding the subject so as to bring the detected distance closer to the reference distance.

Thus, it is possible to guide the user to bring the distance between the information processing device and the face of the user closer to the reference distance, and if the user follows the guidance, it is possible to obtain captured images while the distance between the information processing device and the face of the user is constant.

In the embodiment above, for example, the evaluation of the image of the face of the subject may include a skin analysis of the face of the subject.

In the embodiment above, for example, the detected distance may be a distance between a camera of the information processing device and the reference portion of the face of the user.

One embodiment of an information processing device according to the present disclosure is an information processing device including: a camera for receiving an image; a display having a display surface on the same side as an image-receiving side of the camera; and a controller horizontally inverts an image of a face of a subject obtained by using the camera so as to display the horizontally-inverted image on the display, wherein the controller: detects a distance between the information processing device and a reference portion included in the image of the face of the subject; determines a scaling factor based on a ratio between a reference distance used for evaluating the image of the face of the subject and the detected distance; and displays, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

According to the embodiment above, the control method includes: detecting a distance between the information processing device and a reference portion included in the face of the subject; determining a scaling factor based on a ratio between a reference distance used for evaluating the image of the face of the subject and the detected distance; and displaying, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

Thus, where the user captures an image of the face by means of the information processing device, for example, control displays, on the display, a guide image for guiding the face of the user so as to change the distance from the information processing device based on the ratio between the distance between the detected information processing device and the reference portion included in the face of the user (subject) and the reference distance used for evaluating the image of the face; and the user changes distance from the information processing device by moving the position of the face of the user himself/herself, referring to the guide image, for example.

Therefore, it is possible to capture an image of the face while keeping a constant distance between the information processing device and the face of the user. Here, no parts of the face need to be fixed using equipments, or the like, in order to capture an image of the face while keeping the distance constant, and it is therefore possible to simplify the device and to capture an image of the face under natural circumstances, while causing no trouble for the user of fixing his/her face to the device.

Moreover, for example, where an image-capturing operation is done every day, the image-capturing operation can be performed under the same condition, making it easier to compare between past and current skin conditions.

For example, where the skin condition is evaluated based on a captured image of the face, for example, the size of an area that is determined to be a spot or a wrinkle on the skin surface based on the captured image of the face can be measured by counting the number of pixels on the captured image.

One embodiment of a program for controlling an information processing device according to the present disclosure is a program for controlling an information processing device including a camera for receiving an image and a display having a display surface on the same side as an image-receiving side of the camera, wherein: the program causes a computer of the information processing device for receiving an image of a face of a subject from the camera, horizontally inverting the received image, and displaying the horizontally-inverted image on the display, to execute: detecting a distance between the information processing device and a reference portion included in the face of the subject; determining a scaling factor based on a ratio between a reference distance used for evaluating the image of the face of the subject and the detected distance; and displaying, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

According to the embodiment above, the control method includes: detecting a distance between the information processing device and a reference portion included in the face of the subject; determining a scaling factor based on a ratio between a reference distance used for evaluating the image of the face of the subject and the detected distance; and displaying, on the display, as a guide image for guiding the subject in such a direction as to change a distance between the information processing device and the subject, an image corresponding to at least one part included in an image obtained by enlarging or shrinking the horizontally-inverted image of the face based on the determined scaling factor.

Thus, where the user captures an image of the face by means of the information processing device, for example, control displays, on the display, a guide image for guiding the face of the user so as to change the distance from the information processing device based on the ratio between the distance between the detected information processing device and the reference portion included in the face of the user (subject) and the reference distance used for evaluating the image of the face; and the user changes distance from the information processing device by moving the position of the face of the user himself/herself, referring to the guide image, for example.

Therefore, it is possible to capture an image of the face while keeping a constant distance between the information processing device and the face of the user. Here, no parts of the face need to be fixed using equipments, or the like, in order to capture an image of the face while keeping the distance constant, and it is therefore possible to simplify the device and to capture an image of the face under natural circumstances, while causing no trouble for the user of fixing his/her face to the device.

Moreover, for example, where an image-capturing operation is done every day, the image-capturing operation can be performed under the same condition, making it easier to compare between past and current skin conditions.

For example, where the skin condition is evaluated based on a captured image of the face, for example, the size of an area that is determined to be a spot or a wrinkle on the skin surface based on the captured image of the face can be measured by counting the number of pixels on the captured image.

Another embodiment of a control method for controlling an information processing device is a control method for controlling an information processing device including a camera for receiving an image and a display having a display surface on the same side as an image-receiving side of the camera, wherein: the control method causes a computer of the information processing device for receiving an image of a face of a subject from the camera, horizontally inverting the received image, and displaying the horizontally-inverted image on the display, to execute: displaying, on the display, a guide image for guiding the subject in such a direction as to change a distance between the information processing device and the face of the subject, the guide image corresponding to a reference size of a reference portion of the image of the face.

Another embodiment of a control method for controlling an information processing device is a control method for controlling an information processing device including a camera for receiving an image and a display having a display surface on the same side as an image-receiving side of the camera, wherein: the control method causes a computer of the information processing device for receiving an image of a face of a subject from the camera, horizontally inverting the received image, and displaying the horizontally-inverted image on the display, to execute: detecting a distance between the camera and a reference portion included in the face of the subject; displaying, on the display, a guide image for guiding the subject in such a direction as to change a distance between the information processing device and the subject, the guide image corresponding to at least one part included in an image obtained by enlarging or shrinking the horizontally-inverted image of the face; displaying, on the display, a guide image corresponding to at least one part of the shrunk face image if it is determined that the detected distance is less than a reference distance for evaluating the image of the face of the subject; and displaying, on the display, a guide image corresponding to at least a portion of the enlarged face image if it is determined that the detected distance is greater than the reference distance for evaluating the image of the face of the subject.

An information processing device and a method for controlling the same according to an embodiment will now be described with reference to the drawings.

FIG. 1(a) is a diagram showing an information processing device 101 according to an embodiment. The information processing device 101 includes a camera 10, a light source 12, a display 14 and a control device 18. FIG. 1(b) is a diagram showing a configuration of the control device 18. The control device 18 includes a microcomputer 18A, a memory 18B and a communication section 18C. The microcomputer 18A controls the overall operation of the information processing device 101, including operations to be described below. The microcomputer 18A executes various processes to be described below, such as image processes. For example, a computer program for controlling various operations of the information processing device 101 is stored in the memory 18B, and the microcomputer 18A controls the operation of various components of the information processing device 101 and executes various processes such as image processes in accordance with the computer program.

The camera 10 captures an image of a face 21 of the user, obtaining image data of the face. In this process, the light source 12 (lighting device) for outputting polarized light is used in the present embodiment in order to more accurately calculate the feature indices of the image.

FIG. 2(a) and FIG. 2(b) are a front view and a side view, respectively, showing an arrangement of the camera 10, the light source 12 and the display 14 of the information processing device 101. In the present embodiment, the light source 12 is provided on the display 14, and the light source 12 includes a first light source 12A and a second light source 12B. The display 14 has a display surface on the same side as the image-receiving side of the camera 10. The light source 12 has a light-outputting port on the same side as the image-receiving side of the camera 10.

As shown in FIG. 2(*b*), when the information processing device 101 is used to analyze the skin, the user keeps the face 21 at a position at about the distance x, for example, away from the display 14. Then, the face 21 of the user is at a position at about the distance i, for example, away from the camera 10. The optical system of the camera 10 is set so that it is possible to capture an image of the entire face with a suitable size and resolution in such a state. For example, the size of the display 14 includes a width W of about 30 cm and a height H of about 50 cm. The distance x is about 30 cm to 70 cm, and is about 45 cm, for example. The distance i is about 30 cm to 70 cm, and is 47 cm, for example.

The display 14 displays horizontally-inverted face image data in a display area 16. The microcomputer 18A generates a guide image based on the obtained face image data, and the display 14 displays the guide image. The guide image serves as a guide for guiding the user in such a direction as to change the distance between the information processing device 101 and the face 21 of the user. Note that a user interface such as a touch panel may be provided in the display area 16 of the display 14.

The control device 18 may be connected to a cloud server 102 of the service provider, who provides services relating to the analysis and evaluation of the skin, via the communication section 18C and a communication network 19. In such a case, the communication section 18C transmits, to the cloud server 102, a captured image, the feature indices of the image, the skin evaluation values, etc. Although only one information processing device 101 is shown in FIG. 1(*a*), a plurality of information processing devices 101 may be connected to the cloud server 102.

FIG. 1(*c*) is a diagram showing a configuration of the cloud server 102. The cloud server 102 includes a microcomputer 102A, a memory 102B, a communication section 102C and a database 102D. The cloud server 102 receives, via the communication section 102C, captured images, feature indices of the images, skin evaluation values, etc., from a plurality of information processing devices 101. The cloud server 102 stores the various data received from the plurality of information processing devices 101 to generate statistical data and obtain correlations between the data. It also transmits, to the information processing devices 101, the statistical data and correlations via the communication section 102C.

Figure 3:
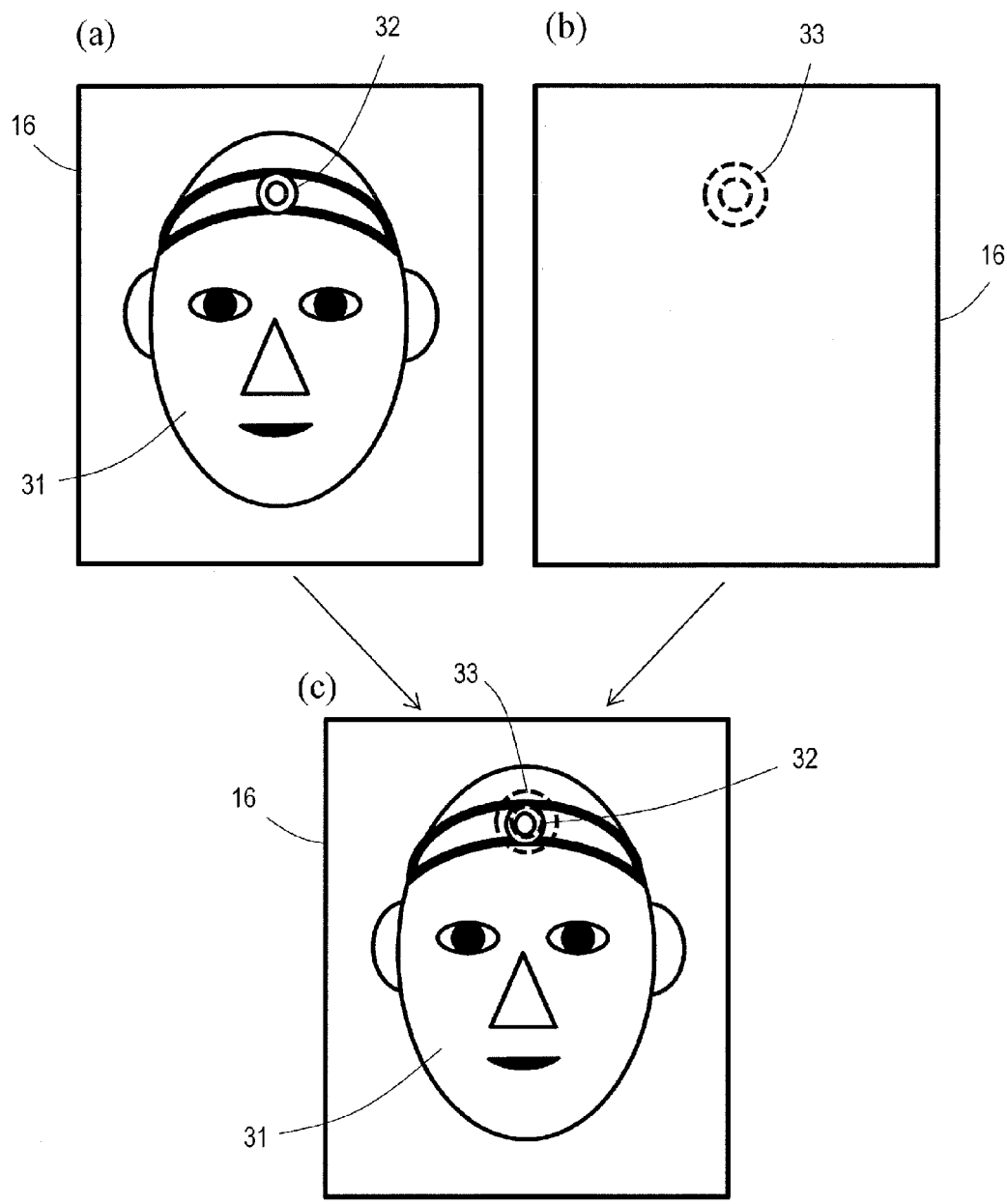
FIG. 3 (a) to (c) are diagrams illustrating a guide image according to an embodiment.

Next, a guide image for guiding the user in such a direction as to change the distance between the information processing device 101 and the face 21 of the user will be described. FIG. 3 is a diagram showing an example guide image. In this example, a marker of a known size is worn on a portion of the face of the user, and the user is guided using a marker image 32 obtained by capturing an image. For example, the user wears a headband having a marker provided thereon on the forehead, and the marker serves as a reference portion of the face.

The camera 10 captures an image of the face of the user wearing the headband, generating a face image 31. FIG. 3(*a*) shows the face image 31 displayed in the display area 16 of the display 14. The marker image 32 is displayed, in the display area 16, as a portion of the face image 31 of the user. Since the actual size of the marker is known, the image size of the marker is also known, as displayed in the display area 16 when the distance between the information processing device 101 and the face 21 of the user is equal to the optimal distance. Thus, the user can move to a position of the optimal distance by guiding the user so that the size of the image of the marker which has been captured and displayed is equal to the image size at the optimal distance.

FIG. 3(*b*) is a diagram showing a guide image 33 corresponding to the image size of the marker at the optimal distance. The data of the guide image 33 is pre-stored in the memory 18B, for example, and the microcomputer 18A reads out the data so as to display, on the display 14, an image obtained by superimposing together the captured face image 31 and the guide image 33. FIG. 3(*c*) is a diagram showing the image used for guiding, which has been generated by superimposing together the captured face image 31 and the guide image 33.

Referring to FIG. 4, a method for guiding the user using the guide image 33 will be described. FIG. 4(*a*) shows the relationship between the marker image 32 and the guide image 33 when the distance between the information processing device 101 and the face 21 of the user is greater than the optimal distance. FIG. 4(*b*) shows the relationship between the marker image 32 and the guide image 33 when the distance between the information processing device 101 and the face 21 of the user is less than the optimal distance. FIG. 4(*c*) shows the relationship between the marker image 32 and the guide image 33 when the distance between the information processing device 101 and the face 21 of the user is equal to the optimal distance.

In the state shown in FIG. 4(*a*), the marker image 32 is displayed to be smaller than the guide image 33. The user can move the face closer to the information processing device 101 to enlarge the marker image 32 so that the size of the marker image 32 coincides with that of the guide image 33 as shown in FIG. 4(*c*), thereby positioning the face at the optimal distance. In the state shown in FIG. 4(*b*), the marker image 32 is displayed to be larger than the guide image 33. The user can move the face away from the information processing device 101 to shrink the marker image 32 so that the size of the marker image 32 coincides with that of the guide image 33 as shown in FIG. 4(*c*), thereby positioning the face at the optimal distance. Thus, the user can be guided to the optimal distance using the guide image 33.

Figure 5:
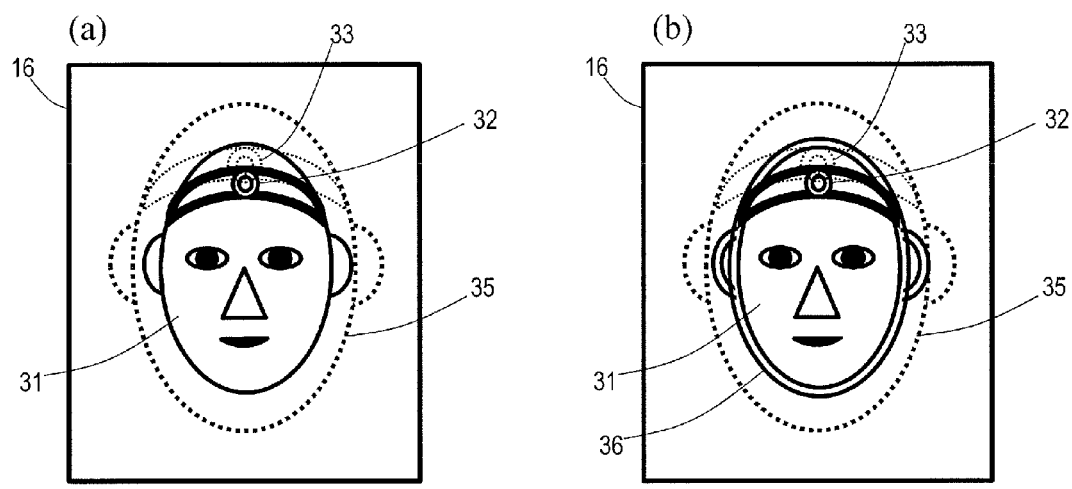
FIG. 5 (a) is a diagram showing a guide image according to an embodiment, and (b) is a diagram showing a basic face guide image according to an embodiment.

Note that a guide corresponding to the outline of the face of the user may be generated using the ratio between the size of the marker image 32 and that of the guide image 33. Since the actual size of the marker is known, it is possible to estimate the actual size of the face that is displayed together with the marker. From there, it is possible to estimate the image size of the face at the optimal distance. That is, by enlarging or shrinking the face image 31 using the ratio between the size of the marker image 32 and that of the guide image 33, it is possible to generate a guide image 35 corresponding to the outline of the face at the optimal distance, as shown in FIG. 5(*a*). The guide image 35 is displayed in the central portion of the display area 16 so that the face of the user is placed at the center of the captured image, for example.

It is also possible to generate a basic face guide image 36 corresponding to the outline of the face, without enlarging or shrinking the face image 31, as shown in FIG. 5(*b*). The basic guide image 36 is displayed in the central portion of the display area 16 so that the face of the user is placed at the center of the captured image, for example.

Figure 6:
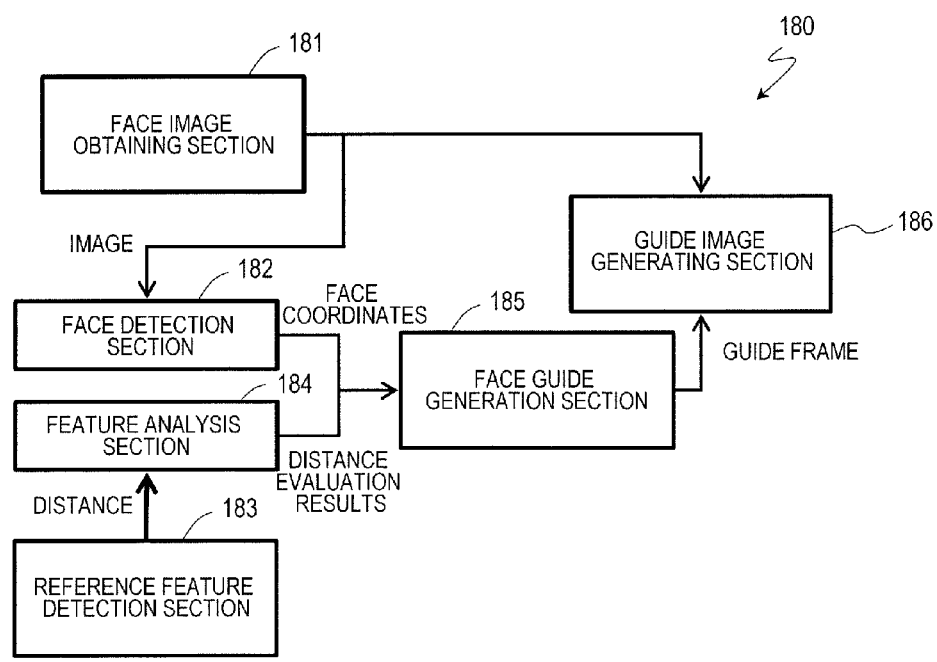
FIG. 6 A diagram showing a processing circuit according to an embodiment.
Figure 7:
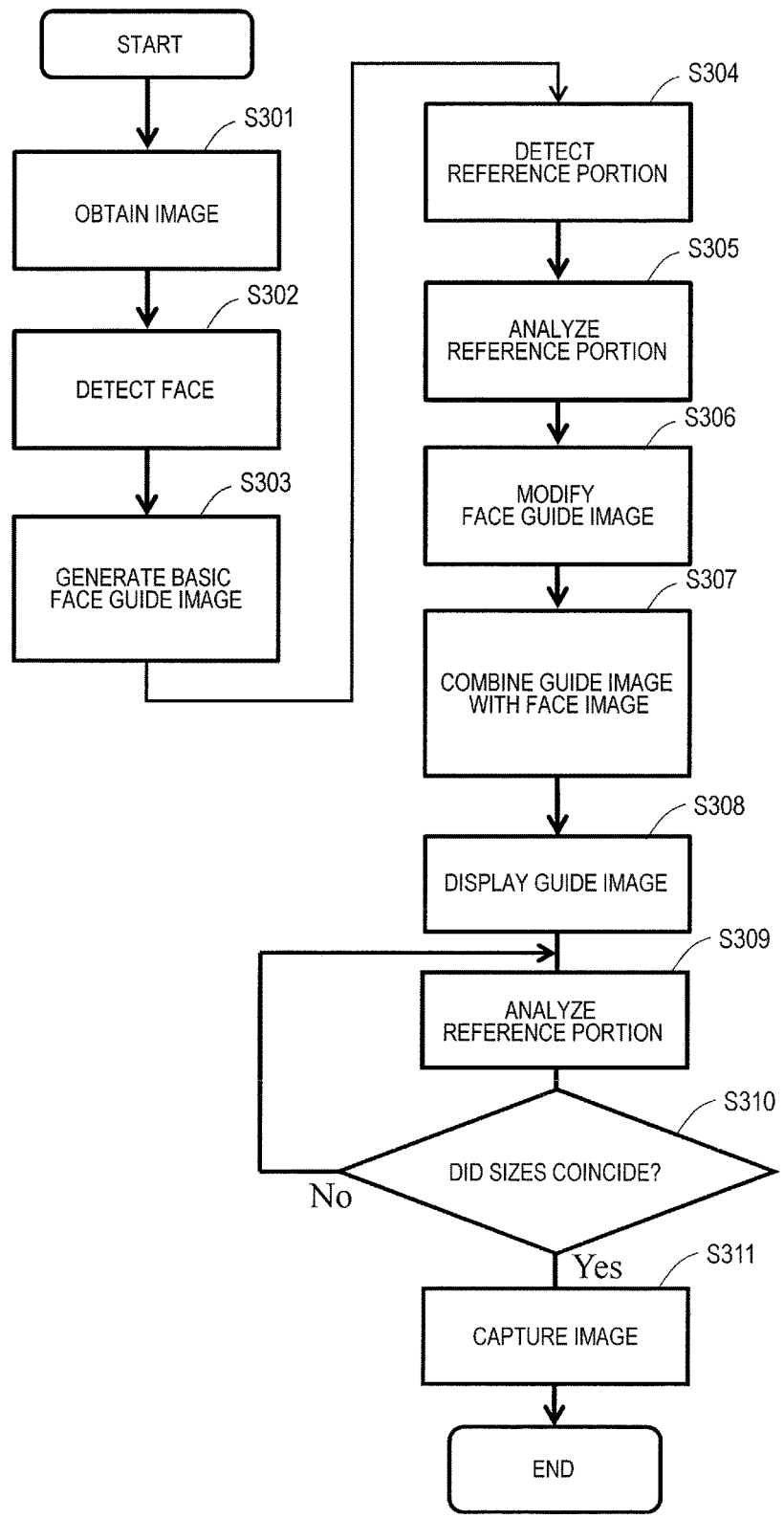
FIG. 7 A flow chart showing an operation of a processing circuit according to an embodiment.

FIG. 6 is a diagram showing a processing circuit 180 of the control device 18. FIG. 7 is a flow chart illustrating an operation of the processing circuit 180. The processing circuit 180 includes a face image obtaining section 181, a face detection section 182, a reference feature detection section 183, a feature analysis section 184, a face guide generation section 185 and a guide image generating section 186. The microcomputer 18A may function also as the processing circuit 180, and the processes of the components of the processing circuit 180 may be executed by the microcomputer 18A.

The face image obtaining section 181 obtains the image data captured by the camera 10 (step 301), and horizontally inverts the image data. The face detection section 182 detects the face image in the image data (step 302). The face detection section 182 generates the basic face guide image 36 corresponding to the size of the face image in the image data (step 303).

The reference feature detection section 183 detects the reference feature portion in the image data (step 304). In this example, the reference feature portion is the marker. The feature analysis section 184 detects the size of the marker image 32 in the image data (step 305). The feature analysis section 184 may calculate the distance between the information processing device 101 and the marker based on the size of the marker image 32.

The face guide generation section 185 calculates the image size of the face at the optimal distance using the ratio between the size of the marker image 32 and that of the guide image 33. Then, it generates the guide image 35 corresponding to the outline of the face image at the optimal distance (step 306). In this process, it may generate the guide image 35 by modifying (enlarging or shrinking) the basic face guide image 36 generated in step 303.

The guide image generating section 186 generates an image obtained by superimposing and combining the guide image 35 and the basic face guide image 36 with the face image 31 (step 307), and the display 14 displays the combined image as a guide image for guiding the user (step 308).

While the user adjusts the position and the tilt of the face, referring to the guide image, the feature analysis section 184 analyzes the size of the marker image in the image data (step 309). The feature analysis section 184 evaluates whether or not the size of the marker image 32 coincides with the size (the size of the guide image 33) at a distance (reference distance) suitable for skin analysis (step 310). If the sizes do not coincide with each other, the analysis continues until they coincide with each other. When the sizes coincide with each other, the camera 10 captures an image of the face of the user (step 311). As the user adjusts the position of the face, referring to the guide image, as described above, it is possible to capture an image at a distance suitable for skin analysis.

Note that the guide image 35 does not need to be generated each time an image is captured, and once the guide image 35 is generated, the guide image 35 may be stored in the memory 18B. At the next time of use, the stored guide image 35 may be read out and displayed while omitting the process of generating the guide image 35.

While the guide image 35 and the basic face guide image 36 have been illustrated as being a guide image and a basic face guide image corresponding to the outline of the face, the shape of the guide image may be other than the outline of the face, and may be a shape corresponding to at least one of the eyes, the nose, the mouth, and the like, for example. The guide image may be, for example, a shape that encircles at least one of the eyes, the nose and the mouth, for example.

It is not necessary that an image-capturing operation for skin analysis be performed only in a state where the distance between the information processing device 101 and the face 21 completely coincides with the optimal distance, as long as the distance is within such a distance range that it is possible to obtain an image suitable for skin analysis, and an image-capturing operation for skin analysis may be performed when the face is located within such a range.

Figure 8:
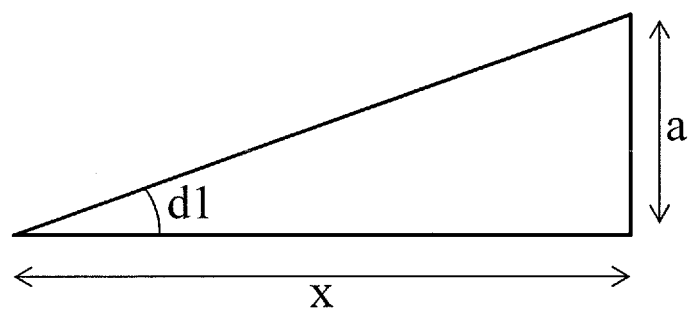
FIG. 8 A diagram illustrating a method for calculating the distance between an information processing device and a marker according to an embodiment.

Next, a method for calculating the distance using the marker will be described. FIG. 8 is a diagram illustrating a method for calculating the distance between the information processing device 101 and the marker. The distance between the information processing device 101 and the marker refers to, for example, the distance between the camera 10 and the marker.

Assume that a denotes the actual length of the subject, and s1 denotes the length of the subject on the captured image of the subject having the actual length a. Also, assume that d1 denotes the viewing angle formed by a straight line extending to the subject from the lens center of the camera 10, and x denotes the distance between the camera 10 and the subject.

Herein, the actual length a of the subject is the actual length between the upper and lower ends (or the left and right ends) of the marker. The actual length a of the marker is known. The on-image length s1 of the subject is defined as the length of the marker image 32 on the captured image of the marker. The viewing angle d1 is defined as the angle formed by a straight line extending to the upper/lower end (or the left/right end) of the marker from the lens center of the camera 10.

When the marker is at a position close to the camera 10 (when the distance between the camera 10 and the marker is short), the on-image length s1 of the marker is large and the viewing angle d1 is also large. When the marker is at a position far away from the camera 10 (when the distance between the camera 10 and the marker is long), the on-image length s1 of the marker is small and the viewing angle d1 is also small. That is, the on-image length s1 of the marker and the viewing angle d1 are in proportion to each other.

The conversion between the on-image length s1 of the marker and the viewing angle d1 is obtained and stored in advance. For example, the conversion is expressed as follows:

$$d1 = c \times s1$$

where c is a proportionality constant.

The relationship between the distance x between the camera 10 and the marker, the actual length a of the marker, and the viewing angle d1 can be expressed as follows:

$$a/x = \tan d1 = \tan(c \times s1)$$

Assuming that the length of the hypotenuse in FIG. 8 is the distance x, the relationship between the distance x, the length a and the viewing angle d1 can be expressed as follows:

$$a/x = \sin d1 = \sin(c \times s1)$$

When the size of the marker is small, it can be expressed as follows:

$$c \times s1 = d1 = a/x$$

$$x = a/(c \times s1)$$

From these relational expressions, the distance x between the camera 10 and the marker can be calculated.

It is possible to generate the guide image 35 corresponding to the optimal distance by using the distance x that is obtained by calculation as described above. The details of the process of generating the guide image 35 based on the distance will be described later.

Figure 9:
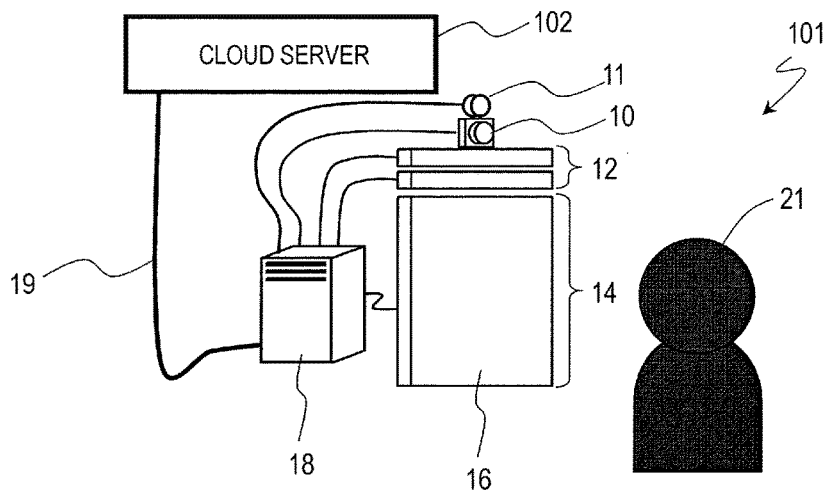
FIG. 9 A diagram showing an information processing device according to an embodiment.

Next, an information processing device including a distance measuring device will be described. FIG. 9 is a diagram showing the information processing device 101 including a distance measuring device 11. The information processing device 101 shown in FIG. 9 has a configuration where the distance measuring device 11 is added to the information processing device 101 shown in FIG. 1. The distance measuring device 11 measures the distance between the information processing device 101 and the face 21 of the user.

Figure 10:
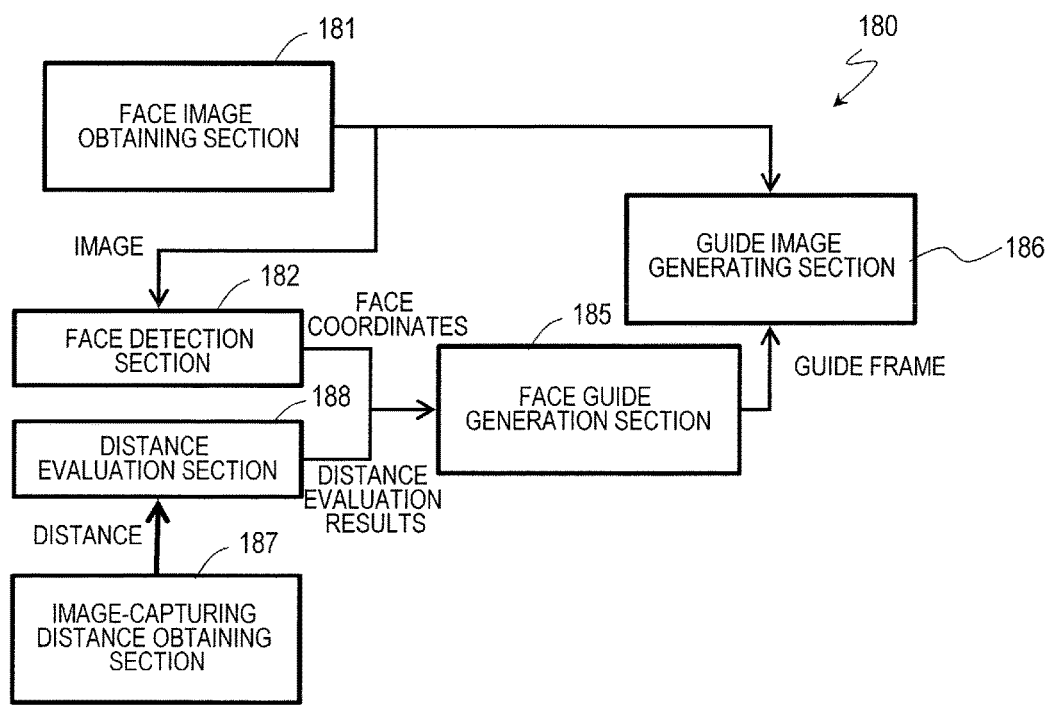
FIG. 10 A diagram showing a processing circuit according to an embodiment.
Figure 11:
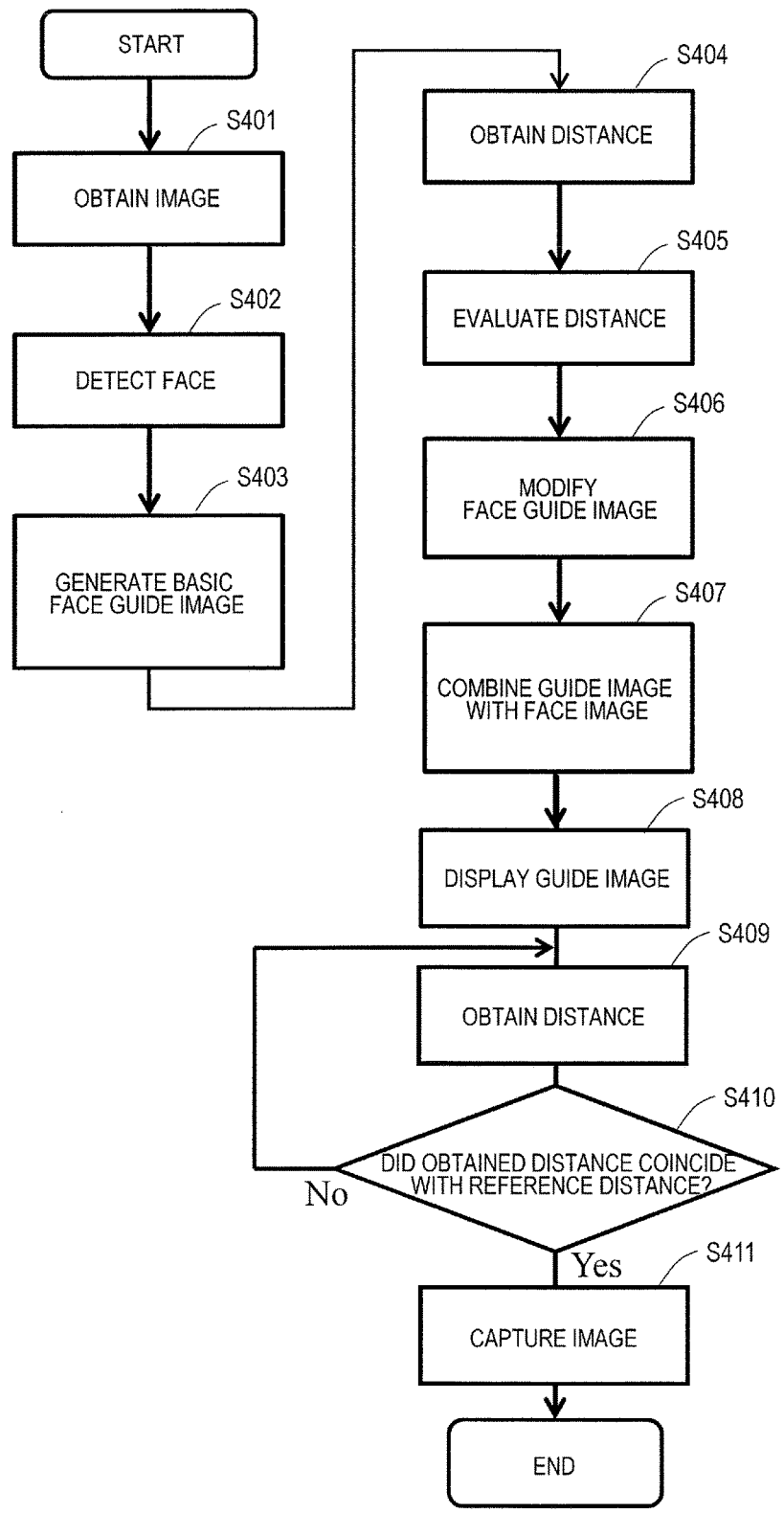
FIG. 11 A flow chart showing an operation of a processing circuit according to an embodiment.

FIG. 10 is a diagram showing the processing circuit 180 of the control device 18 in this example. FIG. 11 is a flow chart illustrating an operation of the processing circuit 180. The processing circuit 180 includes the face image obtaining section 181, the face detection section 182, an image-capturing distance obtaining section 187, a distance evaluation section 188, the face guide generation section 185 and the guide image generating section 186. The microcomputer 18A may function also as the processing circuit 180, and the processes of the components of the processing circuit 180 may be executed by the microcomputer 18A.

Figure 12:
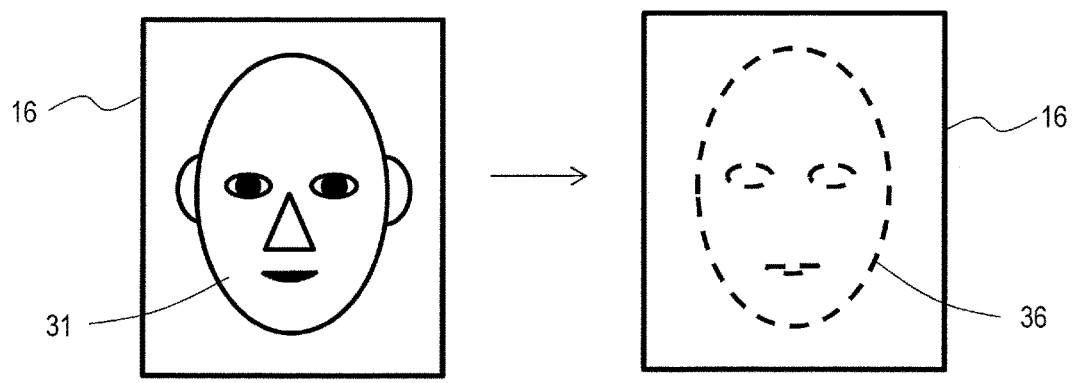
FIG. 12 A diagram showing a basic face guide image according to an embodiment.

The face image obtaining section 181 obtains the image data captured by the camera 10 (step 401), and horizontally inverts the image data. The face detection section 182 detects the face image in the image data (step 402). The face detection section 182 generates the basic face guide image 36 corresponding to the size of the face image in the image data (step 403). FIG. 12 is a diagram showing the basic face guide image 36, which is a guide image corresponding to the size of the face image 31.

The image-capturing distance obtaining section 187 obtains the distance data from the distance measuring device 11 (step 404). The distance evaluation section 188 makes a comparison between the measured distance and the optimal distance (step 405).

The face guide generation section 185 calculates the image size of the face at the optimal distance, by using the ratio between the measured distance and the optimal distance. Then, it generates the guide image 35 corresponding to the outline of the face image at the optimal distance (step 406). In this process, it may generate the guide image 35 by modifying (enlarging or shrinking) the basic face guide image 36 generated in step 403.

Figure 13:
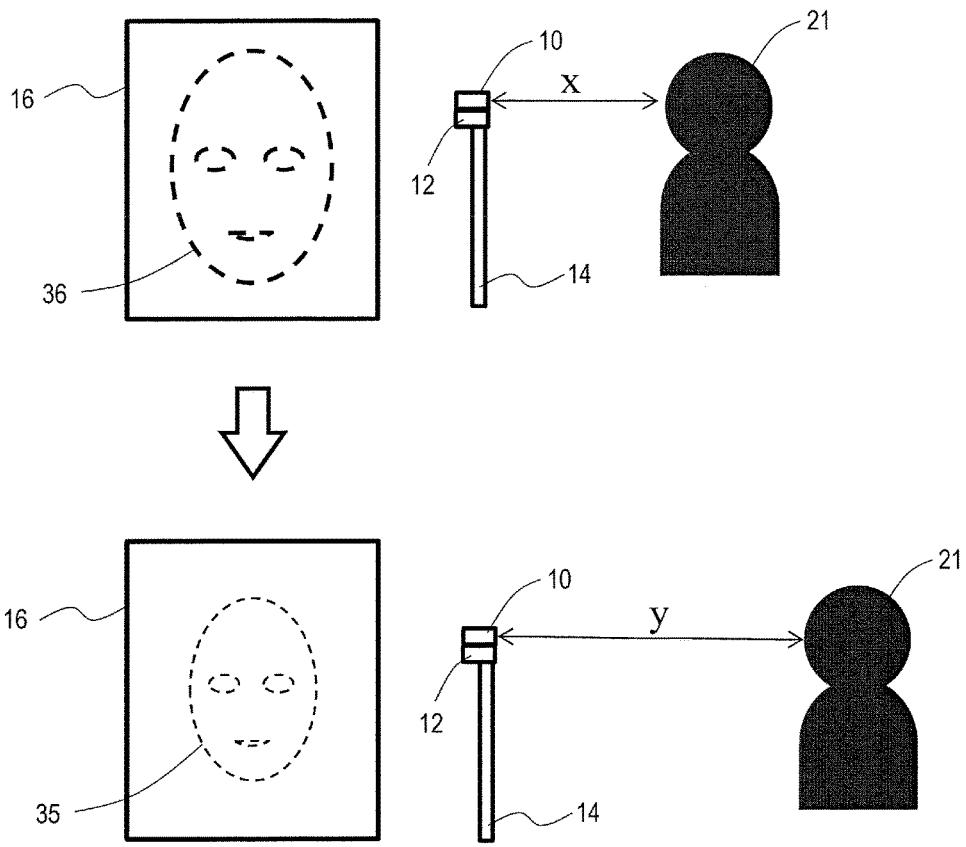
FIG. 13 A diagram showing a relationship between the distance and the image size according to an embodiment.
Figure 14:
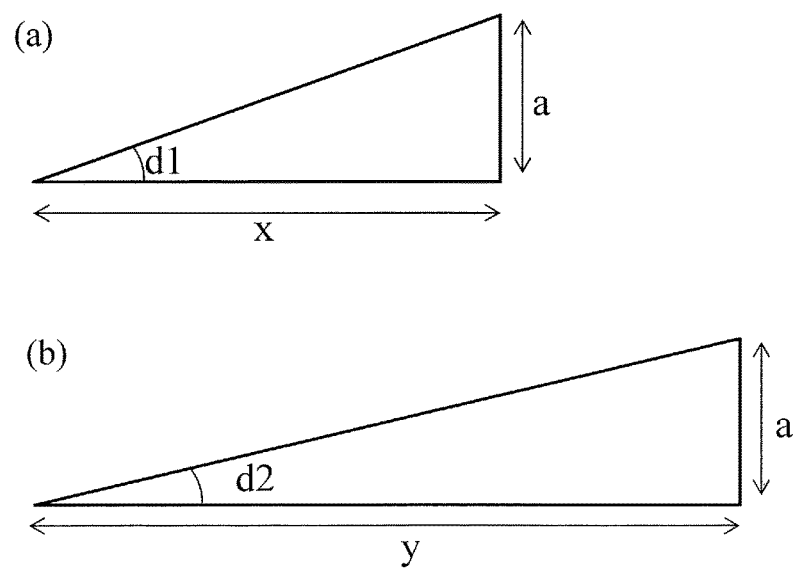
FIGS. 14 (a) and (b) are diagrams illustrating a method for calculating a size of a guide image according to an embodiment.

Now, referring to FIG. 13, FIGS. 14(a) and (b), a method for calculating the size of the guide image will be described.

The size of the guide corresponding to the optimal distance is generally in inverse proportion to the distance between the camera 10 and the face 21. Assume that a denotes the actual length of the subject, and s1 and s2 each denote the length of the subject on the captured image of the subject having the actual length a. Also, assume that d1 and d2 each denote the viewing angle formed by a straight line extending to the subject from the lens center of the camera, and x and y each denote the distance between the camera 10 and the subject.

Herein, the actual length a of the subject is the length between any parts of the head of the user, e.g., the length from the top of the head to the lower end of the chin of the user. Note that the length from the top of the head to the lower end of the chin of the user is an example, and the length a of the subject may be the length between any designated parts, such as the length from the forehead to the chin, the length between the left and right eyes, and the length from an eye to the mouth.

The on-image lengths s1 and s2 of the subject are each an on-image length between designated parts. The viewing angles d1 and d2 are each an angle formed by a straight line extending to a designated part from the lens center of the camera. The distances x and y are each a distance between the camera and a designated part. Herein, the distance x is defined as the current distance between the camera and a designated part, and the distance y as the optimal distance for obtaining the face image suitable for skin analysis.

The relationship between the current distance x between the camera 10 and a designated part, the length a and the viewing angle d1 can be expressed as follows:

$$d1 = \sin^{-1}(a/x)$$

or $$d1 = \tan^{-1}(a/x)$$

The relationship between the optimal distance y between the camera 10 and a designated part, the length a and the viewing angle d2 can be expressed as follows:

$$d2 = \sin^{-1}(a/y)$$

or $$d2 = \tan^{-1}(a/y)$$

The relationship can also be expressed as follows:

$$d1 = a/x$$

$$d2 = a/y$$

Since the on-image length of the subject and the viewing angle are in proportion to each other, the relationship can be expressed as follows:

$$s2/s1 = d2/d1 = x/y$$

$$s2 = (x/y) \times s1$$

The size of the face image obtained by converting the length s1 to the length s2 corresponds to the size of the face image obtained at the optimal distance y. By generating the guide image 35 from the face image obtained by converting the length s1 to the length s2, it is possible to guide the user to the optimal distance y.

For example, when the face of the user is too close to the camera, the guide image 35 is generated from a shrunk face image so as to guide the user toward the direction of moving the face away from the camera. When the face of the user is too far away from the camera, the guide image 35 is generated from an enlarged face image so as to guide the user toward the direction of moving the face closer to the camera.

The guide image generating section 186 generates a combined image by superimposing the guide image 35 over the face image 31 (step 407).

Figure 15:
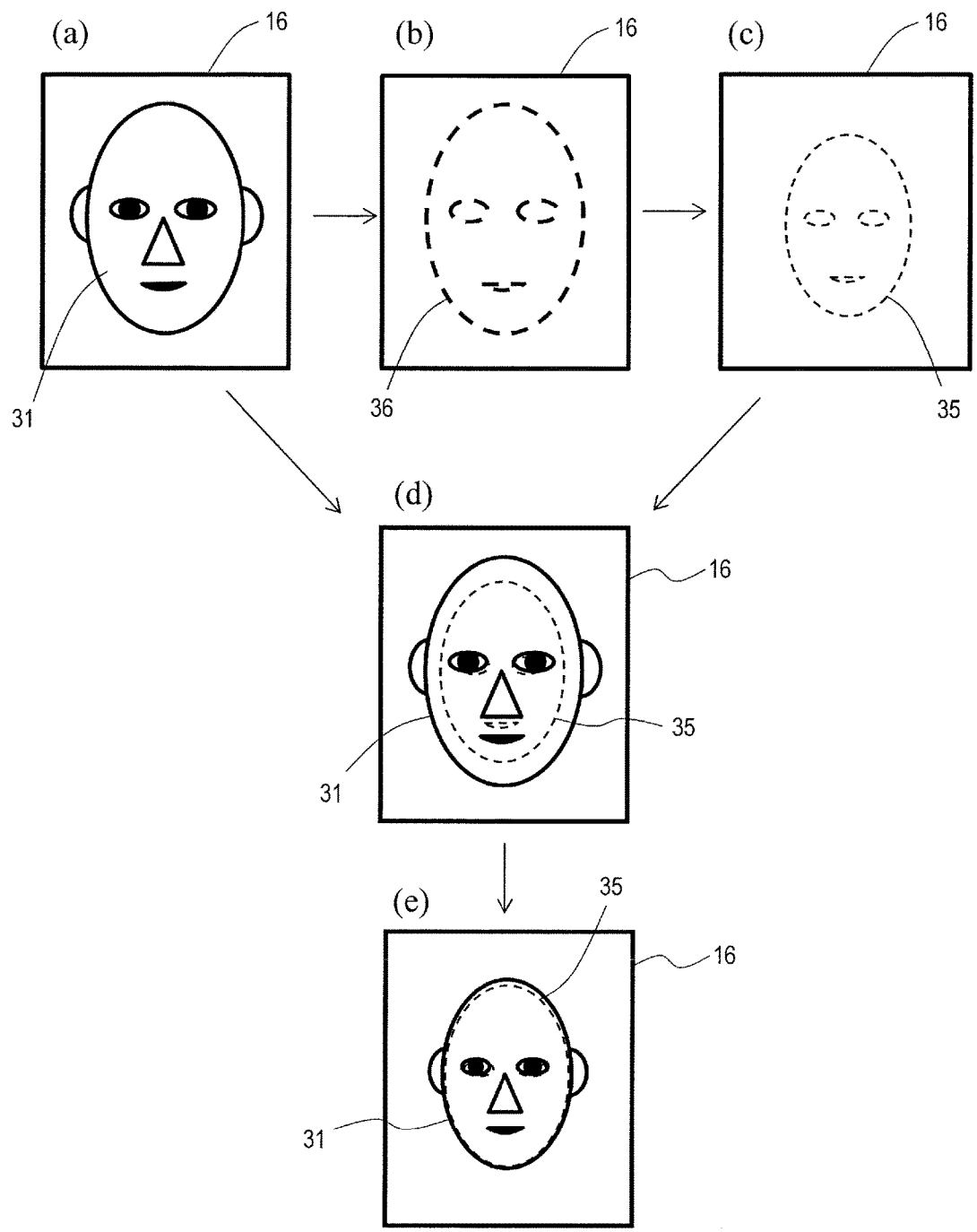
FIG. 15 (a) to (e) are diagrams illustrating an operation of generating a guide image and guiding a user according to an embodiment.

FIG. 15 shows diagrams showing a process of generating a guide image. FIG. 15(a) shows the face image 31, FIG. 15(b) shows the basic face guide image 36, and FIG. 15(c) shows the guide image 35. As shown in FIG. 15(d), the guide image generating section 186 produces a combined image by superimposing the guide image 35 over the face image 31. The display 14 displays the combined image as a guide image for guiding the user (step 408). The guide image 35 is displayed in the central portion of the display area 16 so that the face of the user is placed at the center of the captured image, for example. As the user moves the position of the face, referring to the guide image, the face image 31 and the guide image 35 coincide with each other, as shown in FIG. 15(e), allowing for an image to be captured at the optimal distance.

While the user adjusts the position and the tilt of the face, referring to the guide image, the image-capturing distance obtaining section 187 obtains the distance data from the distance measuring device 11 (step 409). The distance evaluation section 188 evaluates whether or not the measured distance coincides with the distance (reference distance) suitable for skin analysis (step 410). When the distances do not coincide with each other, control continues to obtain the distance data until they coincide with each other. When the distances coincide with each other, the camera 10 captures an image of the face of the user (step 411). As the user adjusts the position of the face, referring to the guide image, as described above, it is possible to capture an image at a distance suitable for skin analysis.

Note that it is not necessary that an image-capturing operation for skin analysis be performed only in a state where the distance between the information processing device 101 and the face 21 completely coincides with the optimal distance y, as long as the distance is within such a distance range that it is possible to obtain an image suitable for skin analysis, and an image-capturing operation for skin analysis may be performed when the face is located within such a range.

The guide image 35 does not need to be generated each time an image is captured, and once the guide image 35 is generated, the guide image 35 may be stored in the memory 18B. At the next time of use, the stored guide image 35 may be read out and displayed while omitting the process of generating the guide image 35.

Next, referring to FIG. 16 and FIG. 17, a process of measuring the distance for each part of the face and to generate the guide image will be described.

Figure 16:
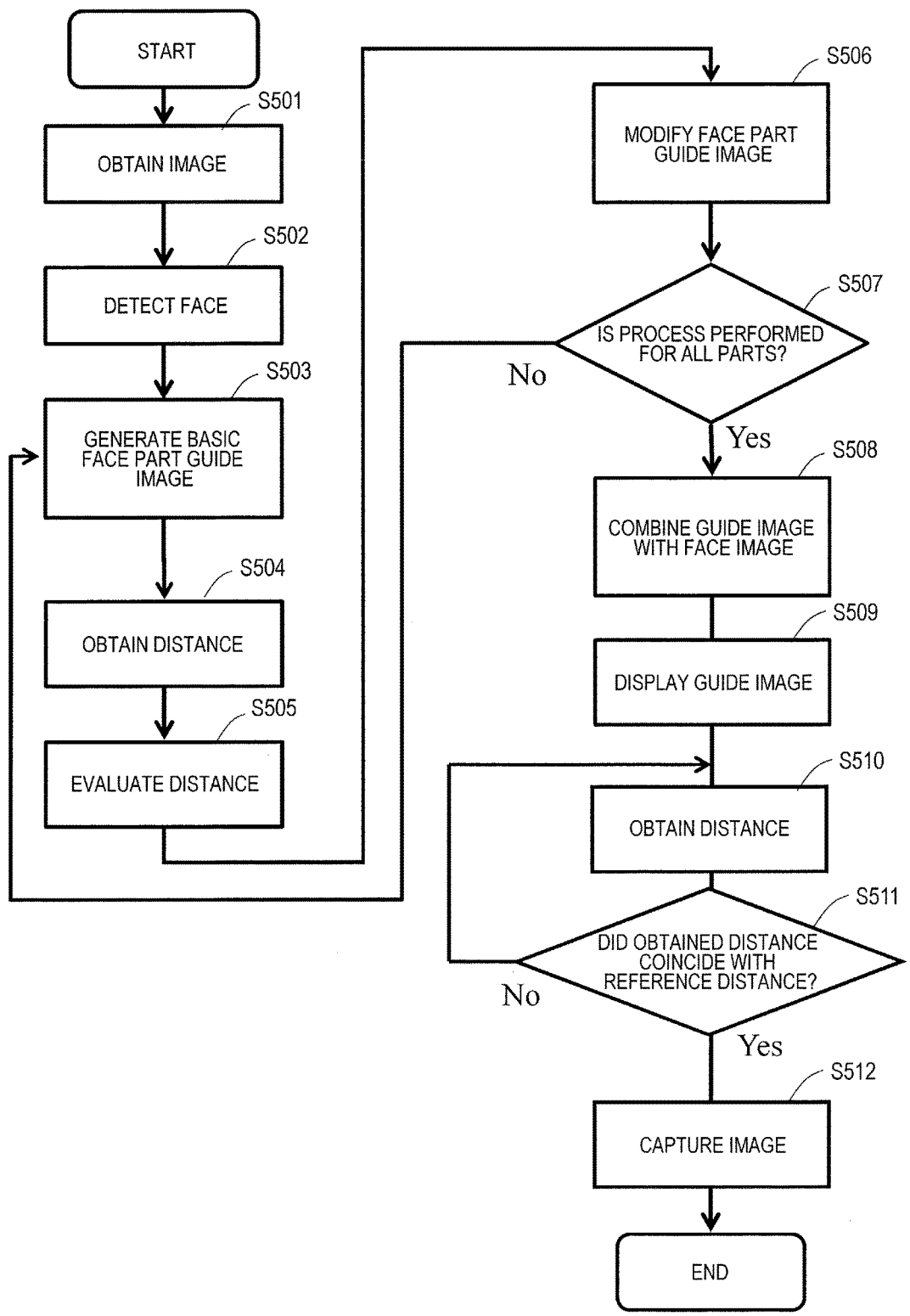
FIG. 16 A flow chart showing an operation of a processing circuit according to an embodiment.
Figure 17:
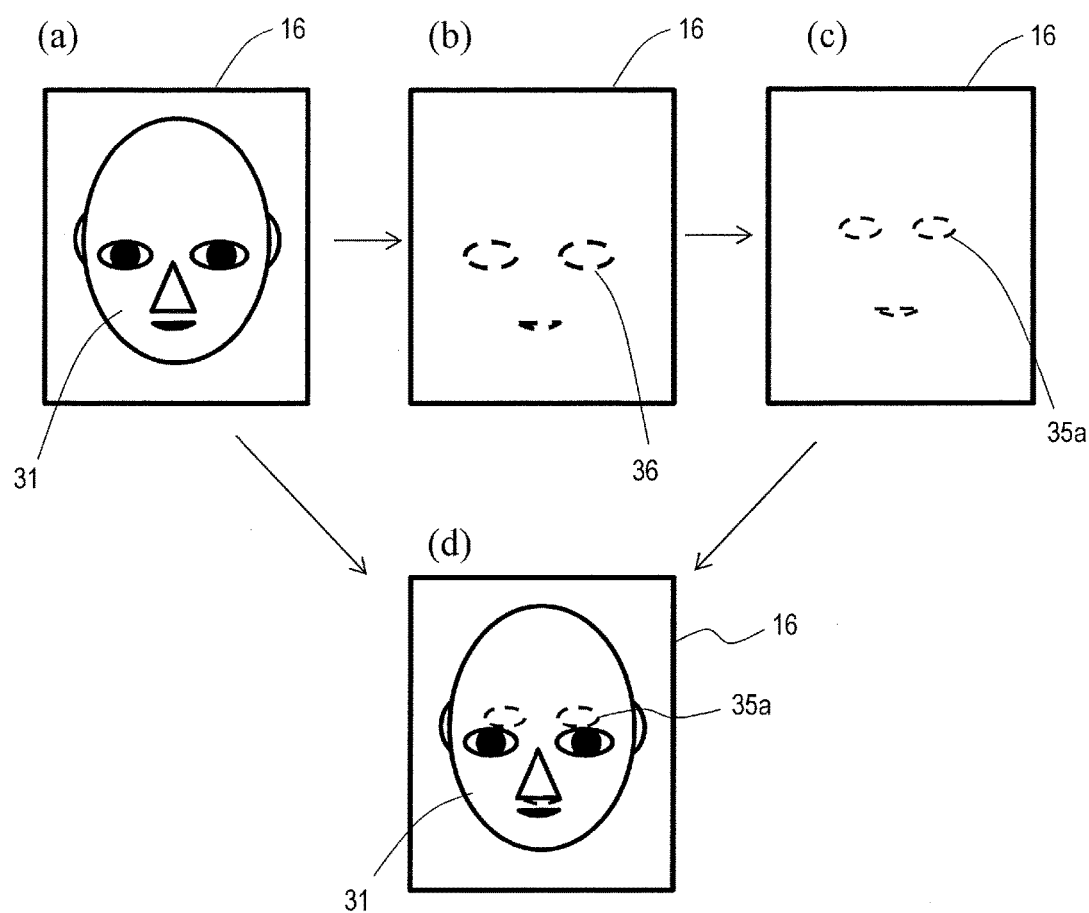
FIG. 17 (a) to (d) are diagrams illustrating an operation of generating a guide image according to an embodiment.

FIG. 16 is a flow chart illustrating an operation of the processing circuit 180 (FIG. 10) in this example. FIG. 17 shows diagrams showing a process of generating a guide image. FIG. 17(a) shows the face image 31, which is an image of the face tilted forward in this example. FIG. 17(b) shows the basic face part guide image 36 obtained from the image of the face tilted forward. FIG. 17(c) shows a guide image 35a corresponding to a face image as seen from directly in front at the optimal distance. FIG. 17(d) shows a combined image obtained by superimposing the guide image 35a over the face image 31. The up-down and left-right balance would be better maintained to improve the accuracy of skin analysis if the face were facing frontward. Thus, the guide of this example guides the user to turn the face, which is facing in a tilted direction, toward the frontward direction. In this example, a plurality of portions or the face of the user are designated as reference portions of the face of the user. The plurality of portions may include at least one portion selected from each of the left half and the right half of the face of the user. Moreover, the same number of portions may be selected from the left half and the right half of the face of the user. The plurality of portions may include at least one portion selected from each of the upper half and the lower half of the face with respect to the nose of the user, for example. Moreover, the same number of portions may be selected from each of the upper half and the lower half of the face with respect to the nose tip of the user. Note that the upper half and the lower half of the face may be defined with respect to the nasion, the philtrum, or the like, as well as the nose tip.

The face image obtaining section 181 obtains the image data captured by the camera 10 (step 501), and horizontally inverts the image data. The face detection section 182 detects the face image in the image data (step 502). The face detection section 182 generates the basic face part guide image 36 corresponding to the size of the image of each part of the face in the image data (step 503). FIG. 17(b) shows the basic face part guide image 36.

The distance measuring device 11 measures the distance from the information processing device 101 to each part of the face. The image-capturing distance obtaining section 187 obtains the distance data from the distance measuring device 11 (step 504). The distance evaluation section 188 makes a comparison between the measured distance and the optimal distance (step 505). The degree of tilt of the face is estimated by analyzing distance data for different parts of the face, and analyzing distances between parts.

The face guide generation section 185 calculates the size, for each part of the face, at the optimal distance. When the face is tilted, the size and the position are calculated by estimating the face image to be seen if the face were not tilted (if it were facing directly frontward), by using the degree of tilt. Then, the guide image 35a is generated, which corresponds to the image to be seen if the face were facing directly frontward at the optimal distance as shown in FIG. 17(c) (step 506). In this process, the guide image 35a may be generated by modifying (moving, enlarging, shrinking, etc.) the basic face part guide image 36 generated in step 503. This process is performed for all parts of interest (step 507).

When the generation of a guide image corresponding to all parts of interest is completed, the guide image generating section 186 generates a combined image by superimposing the guide image 35a over the face image 31 (step 508), and the display 14 displays the combined image as a guide image for guiding the user (step 509), as shown in FIG. 17(d).

While the user adjusts the position and the tilt of the face, referring to the guide image, the image-capturing distance obtaining section 187 obtains the distance data from the distance measuring device 11 (step 510). The distance evaluation section 188 evaluates whether or not the measured distance coincides with the distance (reference distance) suitable for skin analysis (step 511). When the distances do not coincide with each other, control continues to obtain the distance data until they coincide with each other. When the distances coincide with each other, the camera 10 captures an image of the face of the user (step 512). As the user adjusts the position and the tilt of the face, referring to the guide image, as described above, it is possible to capture an image at a distance suitable for skin analysis.

Note that if a comparison between the distance from the information processing device 101 to a reference portion in the left half of the face and the distance from the information processing device 101 to another reference portion in the right half of the face shows a difference greater than or equal to a predetermined distance, for example, control may determine that the face of the user is not facing frontward but is tilting right or tilting left, and display, on the display 14, a message, or the like, prompting the user to correct the direction of the face. That is, if the distance from the information processing device 101 to a reference portion in the left half of the face is shorter, by a predetermined distance or more, than the distance from the information processing device 101 to another reference portion in the right half of the face, control determines that the user is tilting right, and displays, on the display 14, a message prompting the user to correct the direction of the face toward left. Conversely, if the distance from the information processing device 101 to a reference portion in the right half of the face is shorter, by a predetermined distance or more, than the distance from the information processing device 101 to another reference portion in the left half of the face, control determines that the user is tilting left, and displays, on the display 14, a message prompting the user to correct the direction of the face toward right.

If a comparison between the distance from the information processing device 101 to a reference portion in the upper half of the face and the distance from the information processing device 101 to another reference portion in the lower half of the face shows a difference greater than or equal to a predetermined distance, for example, control may determine that the face of the user is not facing frontward but is tilting up or tilting down, and display, on the display 14, a message, or the like, prompting the user to correct the direction of the face. That is, if the distance from the information processing device 101 to a reference portion in the upper half of the face is shorter, by a predetermined distance or more, than the distance from the information processing device 101 to another reference portion in the lower half of the face, control determines that the user is tilting down, and displays, on the display 14, a message prompting the user to correct the direction of the face upward. Conversely, if the distance from the information processing device 101 to a reference portion in the lower half of the face is shorter, by a predetermined distance or more, than the distance from the information processing device 101 to another reference portion in the upper half of the face, control determines that the user is tilting up, and displays, on the display 14, a message prompting the user to correct the direction of the face downward.

Where a plurality of portions included in the face 21 of the user are designated as reference portions, the distance between the information processing device 101 and the face 21 of the user may be defined as the average value among distances between the information processing device 101 and a plurality of reference portions included in the face 21 of the user. Thus, it is possible to reduce the influence of undulations of the face 21 of the user on the detection of the distance between the information processing device 101 and the face 21 of the user (subject). For example, where the projection of the nose, the hollow about the eyes, and the like, are used as reference portions, it is possible to avoid detecting values that deviate from the distance from the information processing device 101 to the forehead and the cheeks, which account for the majority of the skin of the face 21. This makes it possible to display, on the display 14, such a guide image as to bring the distance between the information processing device 101 and the face 21 of the user (subject) closer to the reference distance with a high accuracy, and it is possible to improve the accuracy of skin analysis based on captured images.

Figure 18:
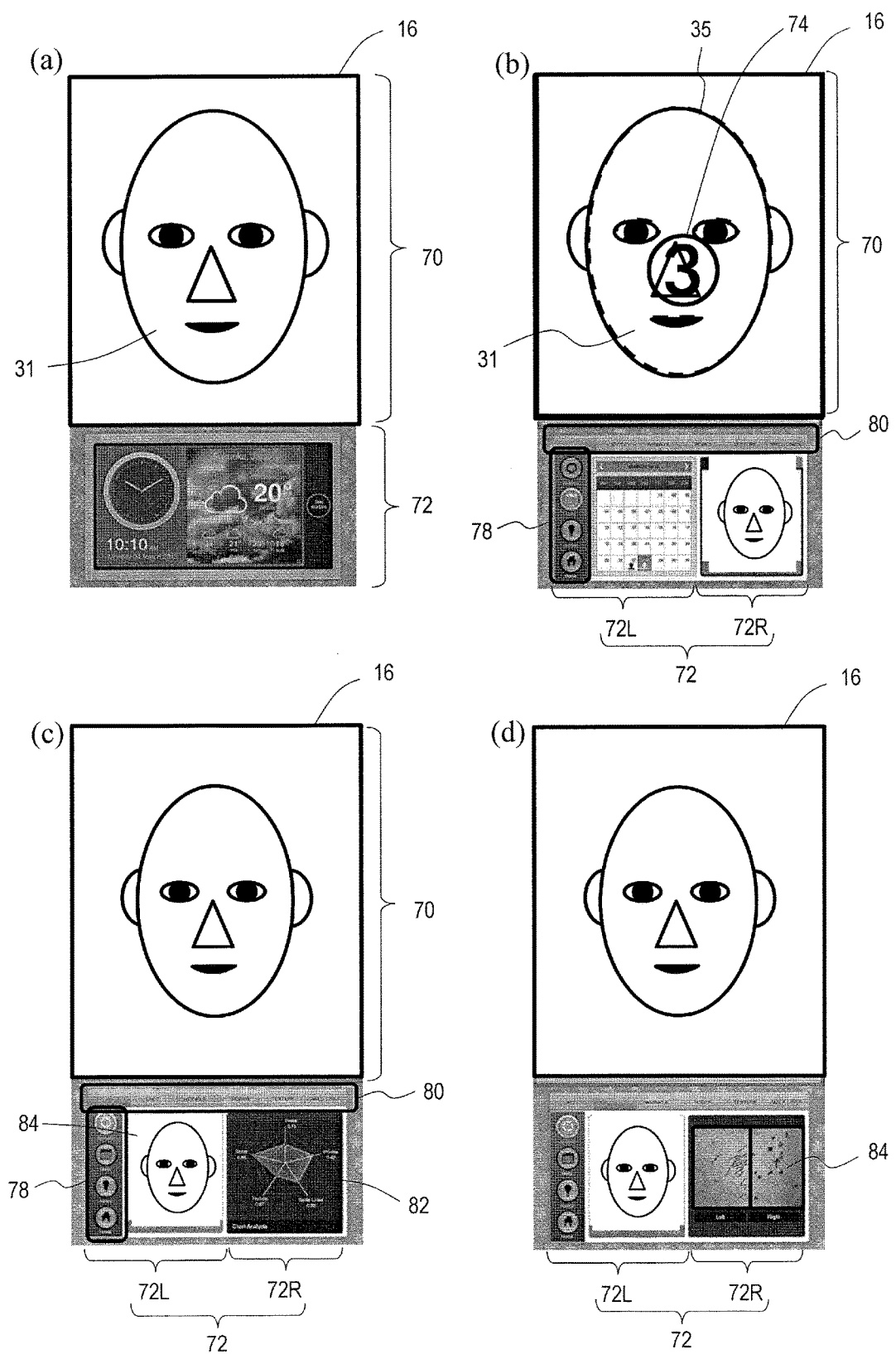
FIG. 18 (a) to (d) are diagrams each illustrating an example image displayed in a display area according to an embodiment.

Next, referring to FIG. 18 to FIG. 20, an example image displayed in the display area 16 will be described.

FIG. 18(a) shows an example of the initial screen displayed in the display area 16 before capturing an image. The display area 16 includes a main screen 70 having a large area, and a sub screen 72 having a small area. On the initial screen, the captured image is displayed in real time on the main screen 70, functioning as a digital mirror. Information such as a clock or weather forecast may be displayed, for example, on the sub screen 72.

FIG. 18(b) shows the screen image immediately before the start of an image-capturing operation. The guide image 35 for guiding the position of the face of the user, for example, is displayed on the main screen 70. A mark or a number 74 may also be shown, which shows the timing of image-capturing operation.

For example, the captured image of the face may be displayed in real time in a right half 72R of the sub screen 72, with a calendar displayed in a left half 72L. The calendar may include a mark, or the like, shown at the position of a date on which an image was captured using the information processing device 101 in the past, for example. After the display of FIG. 18(b), an image is captured for skin analysis as described above, and a skin analysis is performed.

FIG. 18(c) and FIG. 18(d) each show an example screen image to be displayed on the display 14 after the skin analysis. The image captured by the camera 10 is displayed in real time on the main screen 70. The calculated feature indices are shown in a radar chart 82, for example, in the right half 72R of the sub screen. In the figure, the average feature indices for the entire skin area measured are displayed. The image of the face captured during the measurement is shown in the left half 72L. Menu items for specifying face positions are displayed in an upper portion 80 of the sub screen 72, and menu items for switching between content to be displayed and functions are displayed in a left side portion 78. For example, the user can have a particular skin area of the face displayed or can change the content to be displayed by touching on the upper portion 80 and the left side portion 78 of the sub screen 72.

FIG. 18(d) is an example where the location and the feature index specified by the user are displayed in the right half 72R of the sub screen 72. A portion of the captured image, at the position specified by the user, is displayed on an enlarged scale. Spots and wrinkles are shown as red areas, for example.

Figure 19:
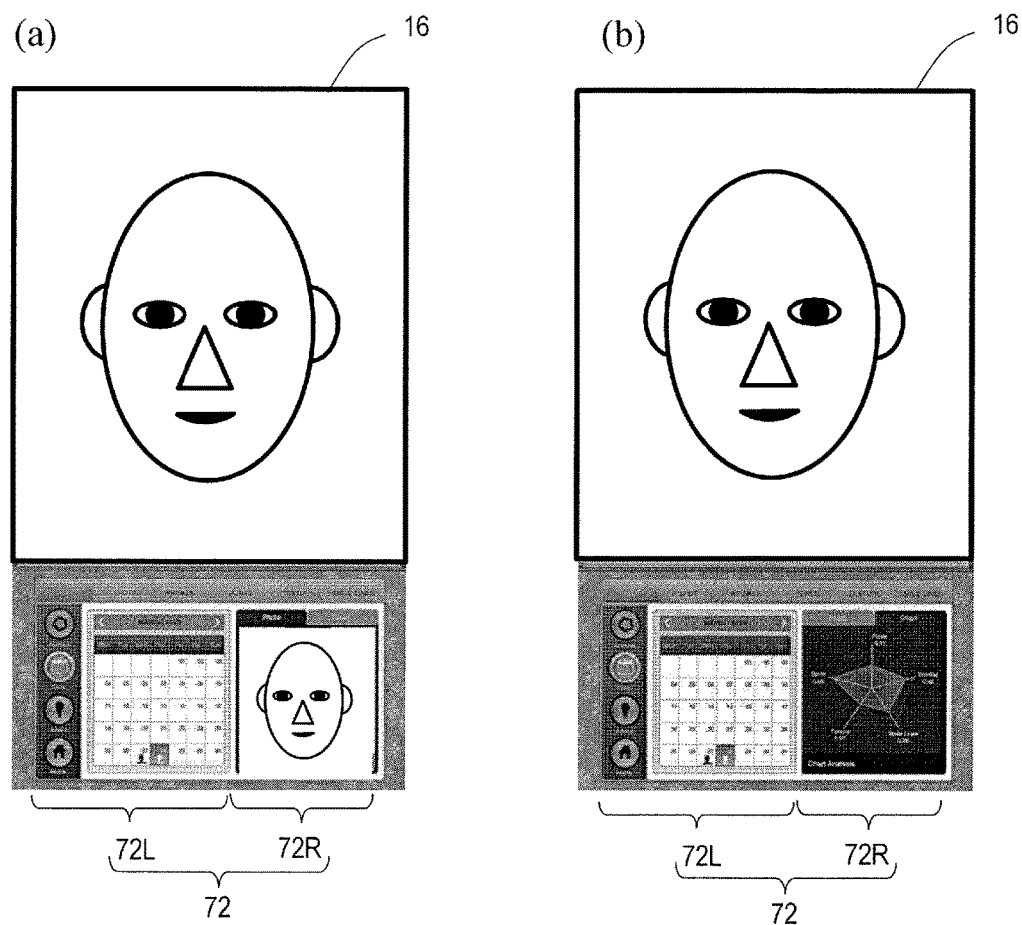
FIGS. 19 (a) and (b) are diagrams each illustrating an example image displayed in a display area according to an embodiment.
Figure 20:
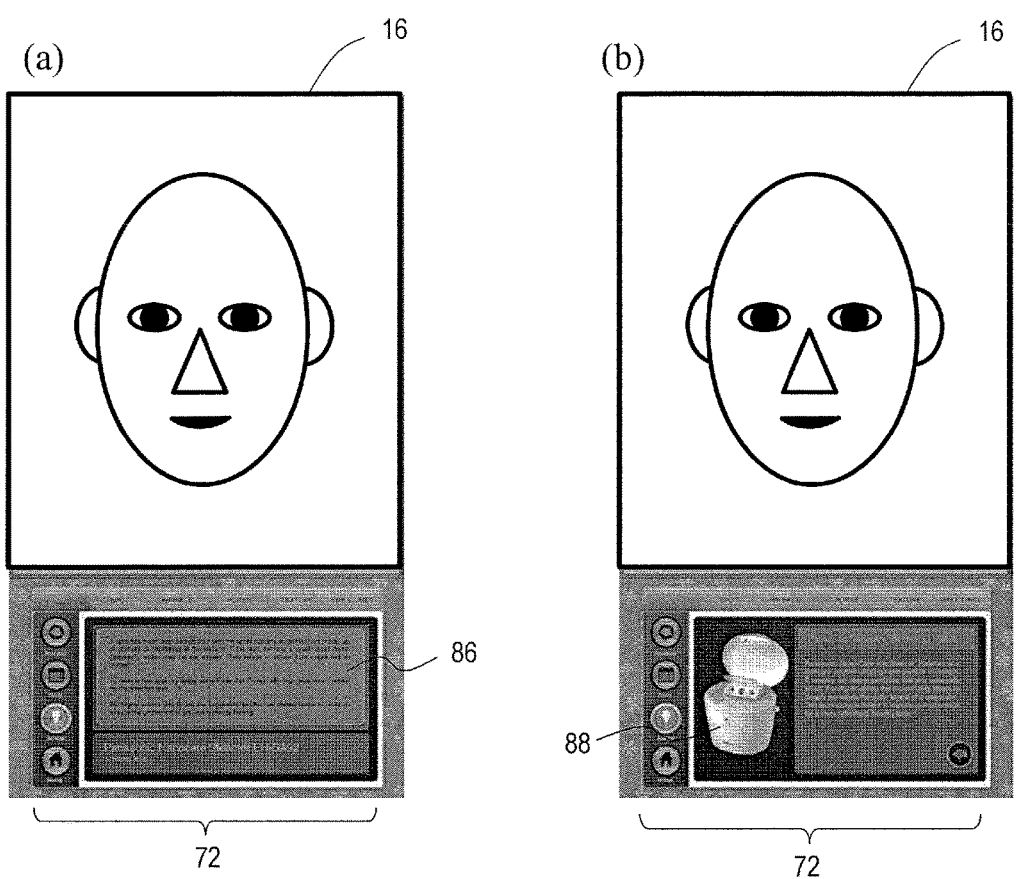
FIGS. 20 (a) and (b) are diagrams each illustrating an example image displayed in a display area according to an embodiment.

FIG. 19 and FIG. 20 each show information displayed on the sub screen 72 of the display 14. For example, as shown in FIG. 19(a), a calendar may be displayed on the sub screen. Past measurement information is shown on the calendar, and past measurement results can be displayed on the main screen 70 if the user touches on the corresponding information on the sub screen, for example. As shown in FIG. 19(b), in such a case, a radar chart of feature indices may be further displayed on the sub screen 72. As shown in FIG. 20(a), there may be displayed advice 86 which is related to esthetics such as skin treatment based on the skin analysis. Information 88 of cosmetics and beauty appliances for improving the skin condition may also be displayed, as shown in FIG. 20(b).

Note that the technique described in the embodiment above may be implemented by a cloud service, for example. For example, the analysis and evaluation of the captured and obtained face image may be performed on a cloud server. For example, the analysis and evaluation of the captured and obtained face image may be performed by any of service types 1 to 4 below. However, types of the cloud service for implementing the technique described in the embodiment above are not limited thereto.

(Service Type 1: On-Premise Data Center-Type Cloud Service)

Figure 21:
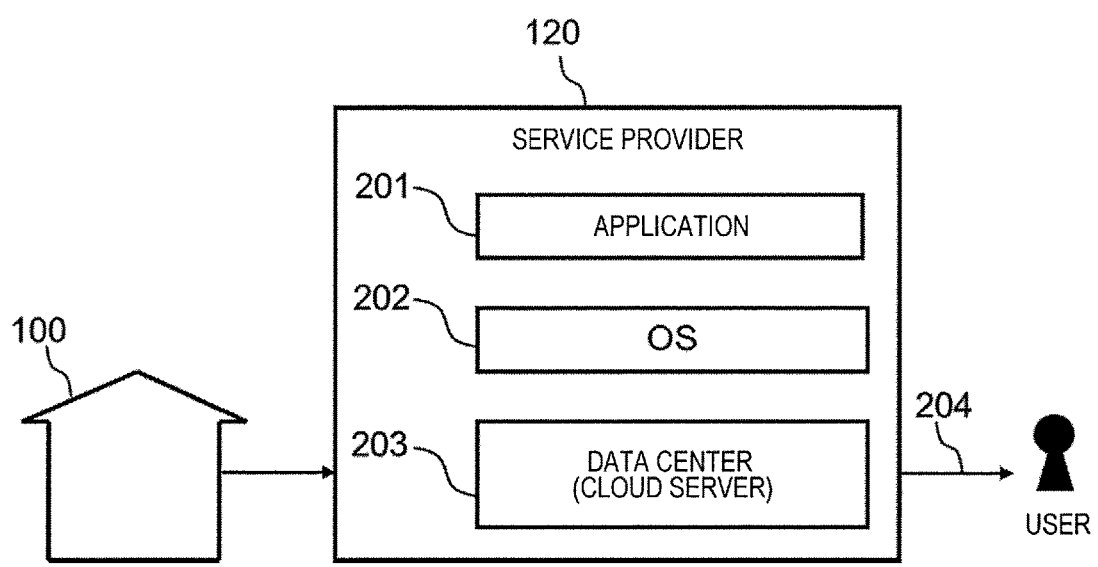
FIG. 21 A diagram showing an overall picture of a service provided by an information management system of service type 1 (on-premise data center-type cloud service) according to an embodiment.

FIG. 21 is a diagram showing an overall picture of a service provided by an information management system of service type 1 (on-premise data center-type cloud service). In this type, a service provider 120 obtains information from a group 100, and provides a service to the user. The group 100 is, for example, a household having the information processing device 101 described above, and the service provider 120 obtains face image data captured by the information processing device 101. The service provider 120 may obtain face image data from a plurality of groups 100. In this type, the service provider 120 has the function of a data center management company. That is, the service provider 120 owns a cloud server 203 for managing big data. Therefore, there is no data center management company.

In this type, the service provider 120 operates and manages the data center (cloud server) 203. The service provider 120 manages an operating system (OS) 202 and an application 201. The service provider 120 provides a service (arrow 204) using the OS 202 and the application 201 managed by the service provider 120. For example, the service provider 120 performs the analysis and evaluation of the face image, and provides the results of the analysis and evaluation to the user.

(Service Type 2: IaaS-Based Cloud Service)

Figure 22:
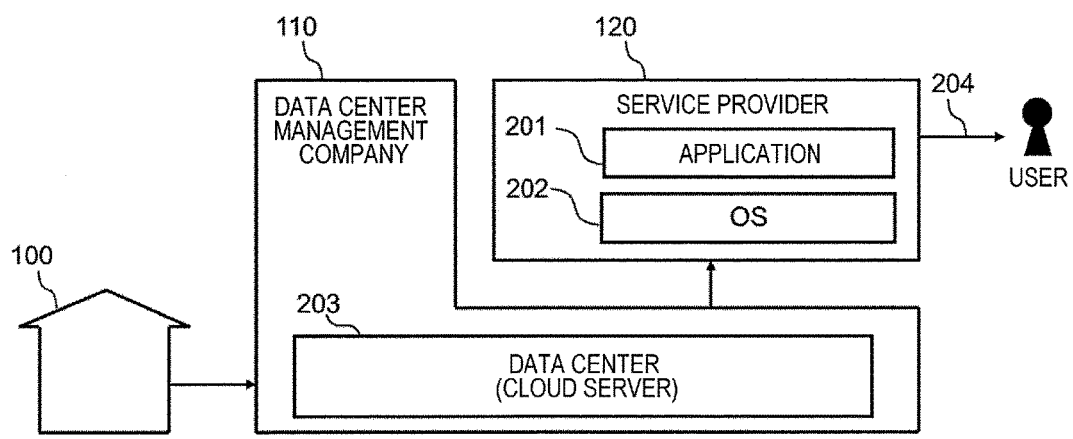
FIG. 22 A diagram showing an overall picture of a service provided by an information management system of service type 2 (IaaS-based cloud service) according to an embodiment.

FIG. 22 is a diagram showing an overall picture of a service provided by an information management system of service type 2 (IaaS-based cloud service). Herein, IaaS stands for Infrastructure as a Service, referring to a cloud service provision model in which the infrastructure for constructing and running a computing system itself is provided as a service via the Internet.

In this type, a data center management company 110 operates and manages the data center (cloud server) 203. The service provider 120 manages the OS 202 and the application 201. The data center management company 110 obtains face image data from at least one group 100. The service provider 120 provides a service (arrow 204) using the OS 202 and the application 201 managed by the service provider 120. For example, the service provider 120 performs the analysis and evaluation of the face image, and provides the results of the analysis and evaluation to the user.

(Service Type 3: PaaS-Based Cloud Service)

Figure 23:
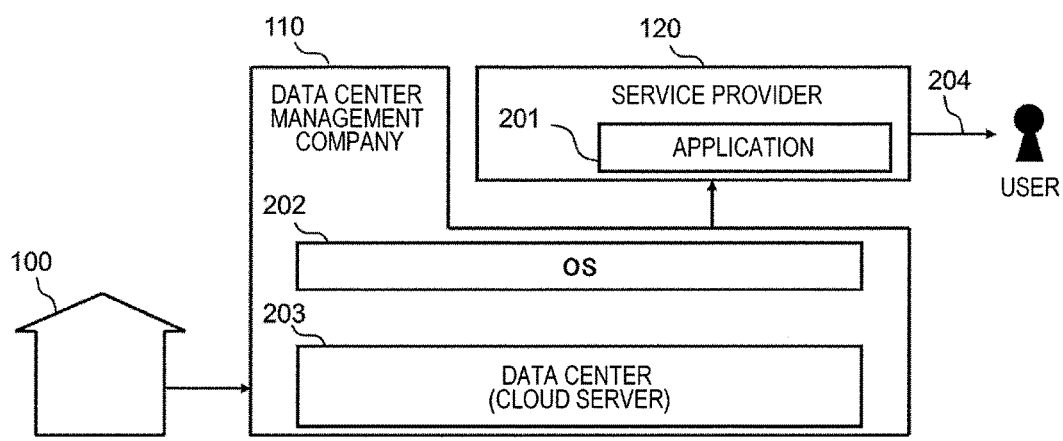
FIG. 23 A diagram showing an overall picture of a service provided by an information management system of service type 3 (PaaS-based cloud service) according to an embodiment.

FIG. 23 is a diagram showing an overall picture of a service provided by an information management system of service type 3 (IaaS-based cloud service). Herein, PaaS stands for Platform as a Service, referring to a cloud service provision model in which the platform serving as a foundation for constructing and running software is provided as a service via the Internet.

In this type, the data center management company 110 manages the OS 202, and operates and manages the data center (cloud server) 203. The service provider 120 manages the application 201. The data center management company 110 obtains face image data from at least one group 100. The service provider 120 provides a service (arrow 204) using the OS 202 managed by the data center management company 110 and the application 201 managed by the service provider 120. For example, the service provider 120 performs the analysis and evaluation of the face image, and provides the results of the analysis and evaluation to the user.

(Service Type 4: SaaS-Based Cloud Service)

Figure 24:
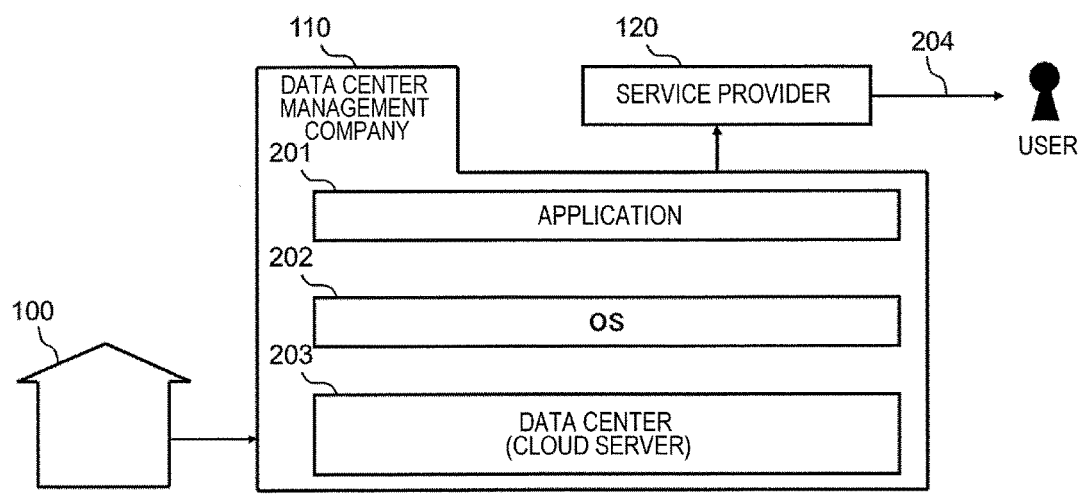
FIG. 24 A diagram showing an overall picture of a service provided by an information management system of service type 4 (SaaS-based cloud service) according to an embodiment.

FIG. 24 is a diagram showing an overall picture of a service provided by an information management system of service type 4 (SaaS-based cloud service). Herein, SaaS stands for Software as a Service. The SaaS-based cloud service is, for example, a cloud service provision model having a function of allowing applications provided by a platform provider that owns a data center (cloud server) to be used, via a network such as the Internet, by users, such as corporates and individuals, who do not own a data center (cloud server).

In this type, the data center management company 110 manages the application 201, manages the OS 202, and operates and manages the data center (cloud server) 203.

The data center management company 110 obtains face image data from at least one group 100. The service provider 120 provides a service (arrow 204) using the OS 202 and the application 201 managed by the data center management company 110. For example, the service provider 120 performs the analysis and evaluation of the obtained face image, and provides the results of the analysis and evaluation to the user.

With any of the cloud service types described above, the service provider 120 provides a service. For example, the service provider or the data center management company may develop, by themselves, an OS, an application, a database for big data, etc., or may outsource the development to a third party.

INDUSTRIAL APPLICABILITY

The technique of the present disclosure is particularly useful in the field of information processing devices.

REFERENCE SIGNS LIST

10 Camera
11 Distance measuring device
12 Light source
14 Display
16 Display area
18 Control device
31 Face image
32 Marker image
33, 35 Guide image
36 Basic face guide image
101 Information processing device
102 Cloud server

The invention claimed is:

1. A control method for controlling an information processing device comprising a camera for receiving an image and a display having a display surface on the same side as an image-receiving side of the camera, the control method comprising:
  receiving an image of a face of a subject from the camera, horizontally inverting the received image,
  displaying the horizontally-inverted image on the display,
  detecting, using a computer of the information processing device, a distance between the information processing device and a reference portion included in the face of the subject;
  determining, using the computer, a scaling factor based on a ratio between a reference distance used for evaluating the image of the face of the subject and the detected distance; and
  displaying on the display a guide image overlaid on the displayed horizontally-inverted image, wherein:
    the guide image is configured to guide the subject in such a direction as to change a distance between the information processing device and the subject, and
    the guide image corresponds to an image obtained by enlarging or shrinking the horizontally-inverted image of the face based on the determined scaling factor.

2. The control method according to claim 1, wherein when it is determined that a difference between the reference distance and the detected distance is within a predetermined range, the camera is activated to capture an image of the subject.

3. The control method according to claim 2, wherein:
the information processing device comprises a lighting device having a light-outputting port on the same side as the image-receiving side of the camera; and
when capturing an image of the subject, the lighting device is activated to irradiate the subject with light.

4. The control method according to claim 2, wherein the captured image is an image to be used for evaluating the face of the subject.

5. The control method according to claim 1, wherein the guide image is displayed on the display while being superimposed over the image of the face of the subject.

6. The control method according to claim 1, wherein the image corresponding to the at least one part has a shape corresponding to an outline of the at least one part.

7. The control method according to claim 6, wherein the shape corresponding to the outline of the at least one part includes a shape corresponding to at least one of the eyes, the nose and the mouth.

8. The control method according to claim 1, wherein the image corresponding to the at least one part has a shape corresponding to an outline of the face of the subject or an outline of the eyes, the nose or the mouth included in the face of the subject.

9. The control method according to claim 1, wherein:
the reference portion is a plurality of portions included in the face of the subject; and
the distance is an average distance among distances between the information processing device and a plurality of reference portions included in the face of the subject.

10. The control method according to claim 9, wherein the plurality of portions include at least one portion selected from each of a left half and a right half of the face of the subject.

11. The control method according to claim 9, wherein the plurality of portions include at least one portion selected from each of an upper half and a lower half of the face of the subject with respect to a predetermined reference point.

12. The control method according to claim 1, wherein:
an image corresponding to at least one part included in the enlarged image is a guide image for guiding the subject toward a direction of moving the face closer to the information processing device; and
an image corresponding to at least one part included in the shrunk image is a guide image for guiding the subject toward a direction of moving the face of the subject away from the information processing device.

13. The control method according to claim 1, wherein the guide image is an image for guiding the subject so as to bring the detected distance closer to the reference distance.

14. The control method according to claim 1, wherein the evaluation of the image of the face of the subject includes a skin analysis of the face of the subject.

15. The control method according to claim 1, wherein the detected distance is a distance between a camera of the information processing device and the reference portion of the face of the subject.

16. An information processing device comprising:
a camera that receives an image;
a display that has a display surface on the same side as an image-receiving side of the camera; and
a controller configured to:
receive from the camera an image of a face of a subject;
horizontally invert the image of the face of the subject received from the camera;
cause the display to display the horizontally-inverted image;
detect a distance between the information processing device and a reference portion included in the image of the face of the subject;
determine a scaling factor based on a ratio between a reference distance used for evaluating the image of the face of the subject and the detected distance; and
cause the display to display a guide image overlaid on the displayed horizontally-inverted image, wherein:
the guide image is configured to guide the subject in such a direction as to change a distance between the information processing device and the subject, and
the guide image corresponds to an image obtained by enlarging or shrinking the horizontally-inverted image of the face based on the determined scaling factor.

17. A non-transitory computer-readable medium storing a program for controlling an information processing device comprising a camera for receiving an image and a display having a display surface on the same side as an image-receiving side of the camera,
the program causing a computer of the information processing device to:
receive an image of a face of a subject from the camera,
horizontally invert the received image,
display the horizontally-inverted image on the display,
detect a distance between the information processing device and a reference portion included in the face of the subject;
determine a scaling factor based on a ratio between a reference distance used for evaluating the image of the face of the subject and the detected distance; and
cause the display to display a guide image overlaid on the displayed horizontally-inverted image, wherein:
the guide image is configured to guide the subject in such a direction as to change a distance between the information processing device and the subject, and
the guide image corresponds to an image obtained by enlarging or shrinking the horizontally-inverted image of the face based on the determined scaling factor.

* * * * *